United States Patent [19]

Martin

[11] Patent Number: 5,281,988
[45] Date of Patent: Jan. 25, 1994

[54] UNIVERSAL REMOTE CONTROL DEVICE FOR CAMERAS

[76] Inventor: Stanley D. Martin, 1088 Bishop St. #2404, Honolulu, Hi. 96813

[21] Appl. No.: 980,261

[22] Filed: Nov. 23, 1992

[51] Int. Cl.$^5$ .................................................. G03B 17/38
[52] U.S. Cl. ..................................... 354/266; 354/81; 354/295
[58] Field of Search ................ 354/81, 266, 293, 294, 354/295; 340/825.72

[56] References Cited

U.S. PATENT DOCUMENTS 4,801,959  1/1989  Chern ................................ 354/266
5,089,836  2/1992  Chern ................................ 354/266

Primary Examiner—Michael L. Gellner
Assistant Examiner—Howard B. Blankenship

[57] ABSTRACT

A wireless remote controlled, adjustable and programmable freestanding mount and shutter release assembly for various styles of cameras. An enclosure body with adjustable legs houses a microcomputer which directs an electrically controlled piston which delivers its shutter releasing energy through a docked cable release. A collapsible bracket can be optionally secured to the enclosure to align a plunger assembly over a camera's shutter release button. A prominent visual display reveals the status of the control system.

20 Claims, 16 Drawing Sheets

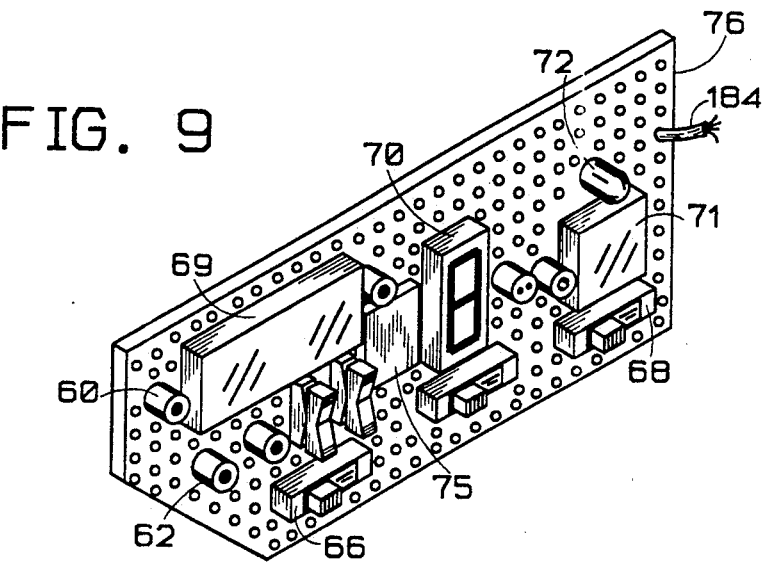
FIG. 9
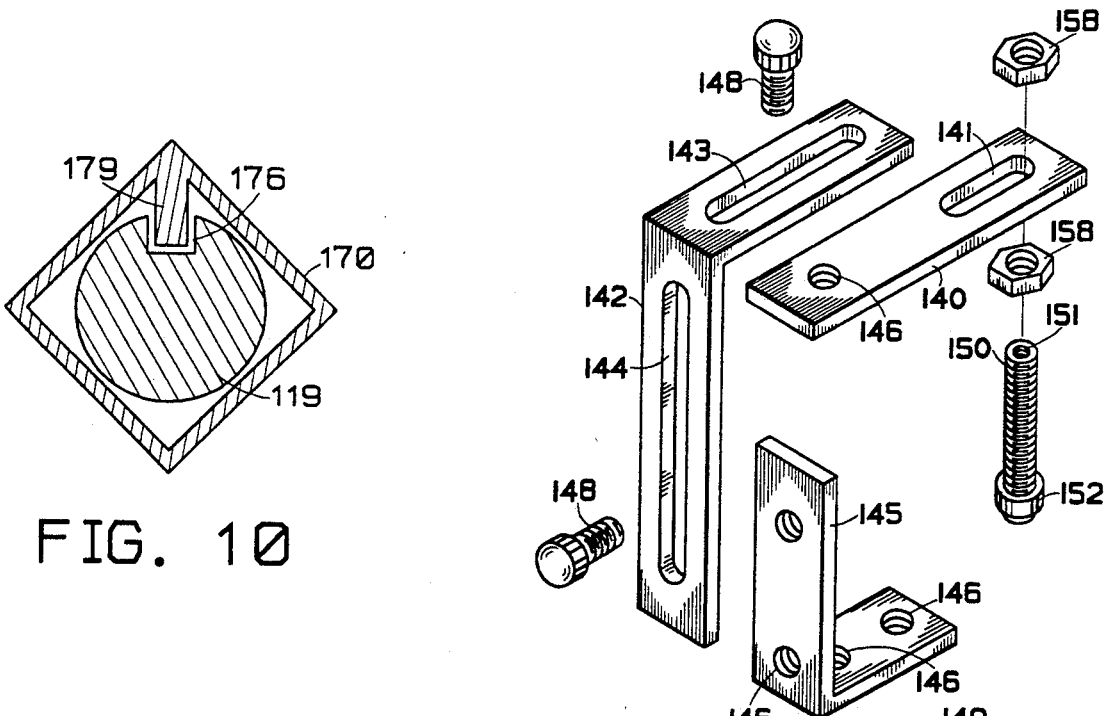
FIG. 10
FIG. 11

UNIVERSAL REMOTE CONTROL DEVICE FOR CAMERAS

BACKGROUND OF THE INVENTION

1. Field of the Invention

This invention relates to a remote control device which can be used with a wide variety of sizes, styles and formats of cameras to provide wireless and programmed control of a camera's shutter release while also allowing the device to provide mounting, support and direction for a camera.

2. Prior Art

There are a great many styles and sizes of cameras the most popular being the 110 style and the 35 mm style although the new disposable types are also gaining popularity. As is well known in prior art there are devices which provide control, in varying degrees, of a camera's shutter. The problem with these devices is that they are not everything to all cameras. An ideal shutter control system should allow such features as activation by remote control, a delayed release control, either one shot or multiple shot control, time exposure control for long exposures, a time lapse control for multiple exposures taken at intervals, an easy connection to an event controlled switch to actuate the shutter when an event happens, an auxiliary switched output to control peripheral equipment or a shutter and a visual display of the status of the control system. Unfortunately, not all cameras have all these features and a great many cameras have none of these features while other cameras have some but not all of these features. This invention encompasses all of the above mentioned ideal features.

When using one or more of the above mentioned shutter control features it is often necessary to have the camera mounted on a tripod or steadfastly held by some other means. This often requires carrying around a sometimes large, bulky and heavy tripod. And without such a tripod it often negates the use of a particular shutter control feature. Furthermore, some styles of cameras do not even have a standard tripod mounting capability. This invention provides a solution to these situations.

As is well known in the prior art a number of attachments are available which serve to overcome the shortcomings of cameras not having any or all of the above mentioned shutter control features. The ideal attachment of this sort should ideally be able to provide all of the above mentioned shutter control features, be readily adaptable to accommodate different sizes and styles of cameras, be removable and be portable. As a further desirable feature such an attachment should be able to hold the camera and provide some means to point the camera to orient it in a particular direction and elevation while providing the shutter control features mentioned above. Unfortunately, not all such attachments provide these features. Some only work with electronic shutter releases and not with mechanical systems. Some only work with tripod mountable cameras but not with other styles. Some only work with cameras that have a standardized cable release feature but not with other styles. Most do not provide a means for holding and pointing the camera while providing any or all of the shutter control features. This invention overcomes all of these shortcomings and provides all of the ideal features of such an attachment for a camera.

It is very common for an individual to have several cameras. It would be very desirable to have one device that could inexpensively transform all of the cameras into much more versatile cameras having features usually found only on more expensive cameras. For individuals having or wishing to acquire an inexpensive featureless camera it would be desirable to have access to an inexpensive device that could easily enhance the camera to have features only available on much more expensive cameras. This invention provides such a device.

Quite often tourists, individuals, families and vacationers wish to take photographs with themselves in the photographs. Common problems in achieving this are not having a tripod to hold the camera, no self timer, a self timer not activating exactly when its desired, no controlled succession of photographs or no remote control capability. Solutions to these problems often include asking a passerby to take the photograph, balancing the camera on a ledge or table,, one member of a group being absent from the photograph while taking it, setting a self timer and hoping to run into the photograph or hiring others to take the photographs. Sometimes these solutions do not provide satisfactory photographic results and result in a risk of damage to the camera should it fall from a table or ledge. This invention provides a dependable solution to these problems.

Photographers that wish to take a succession of photographs at a predetermined time lapse such as photographing a flower opening up are often required to be present to activate the shutter at the designated lapse which may be inconvenient or perhaps impossible. This invention solves that problem. Also, in the example above, a sequence of time lapse photographs may be required to have a long time exposure on each shot. This invention easily and economically performs that function with great precision.

SUMMARY OF INVENTION

In view of the foregoing, the object of this invention is to provide a detachable shutter release device for a camera. A principal feature of the invention is that it is responsive to a wireless remote control transmitter.

Another feature of this invention is that it may be programmed to function in a variety ways.

Another feature of this invention is the ability of the device to act as an adjustably oriented mount for cameras that don't have a tripod mounting feature and as an adjustably oriented mount for cameras that already do have a tripod mounting feature while still providing all of its shutter release control capabilities.

A further feature of the invention is to provide an accurate and controlled time delay of a camera's shutter release.

A still further feature of the invention is to provide an accurate and adjustable time exposure control for a camera having a "B" setting.

Another feature of the invention is the ability to allow multiple exposures in accurate and controlled time lapses.

Another feature of the invention is to provide the above features to cameras that have either mechanical or electromechanical shutter releases.

Another feature of the invention is to provide the above mentioned features in a self contained, easily portable and inexpensive assembly which can be readily adaptable to a wide range of camera styles, sizes and formats.

Briefly stated, these objects and features are attained by mounting the required control circuitry and electromechanical components in a suitably strong, rigid and lightweight box housing. The box housing has a removable and pivotal lid, to which a camera may be secured by a mounting screw, secured to the top face of the box housing by hinge pins and a latching mechanism. An elongated mounting portal on the lid allows the camera, thereto secured by the mounting screw, to be adjustably positioned so as to be balanced and centered as may be required. The mounting screw may be stored in a specifically designed portal in the box housing when not in use. A camera may also be secured to the top face of the box housing with adhesive straps of the hook and latch type. These straps attach to the faces of the box housing equipped with latching strips and flow over the camera to effect the securing of the camera to the top face. The top face of the lid may be coated with a thin layer of frictional material such as, but not limited to rubber or cork to aid in the securement of a camera to its top face. The box housing has at both ends a docking assembly capable of receiving and securely attaching a removable, adjustable, and fragmentable bracket assembly which can align a detachable and adjustable cable release plunger over a camera's shutter release button. Having a docking assembly at both ends allows the front face of the box housing to face in either direction with respect to the camera mounted thereon. One end of the box housing also incorporates a coupling assembly designed to receive and securely attach one end of a cable release cable. The other end of the cable attaches selectively to either the properly aligned cable release plunger or directly into a camera capable of receiving directly a cable release cable. This linking with the cable release transmits the energy from the piston and propels the cable release core to the camera's shutter release. In the instance when the bracket assembly is not required due to the direct attachment of the cable to the camera, the bracket and plunger may be stored in specifically designed compartments built in to the box housing to receive the components of the bracket and plunger. The adhesive straps may also be stored in a specifically designed compartment in the box housing when not in use.

The box housing acts as an adjustable mount for cameras having no built in means for self-mounting, such as a standard tripod mount, and also as a mount for cameras already equipped with such a mounting feature. The box housing itself may be mounted on a tripod with its included tripod mount or placed upon a surface on its bottom face or supported by the included adjustable legs. In the instance when a camera is not required or desired to be mounted on the box housing but is still connected to the camera by the cable release cable being directly attached thereto for the purpose of being controlled by the invention, the box housing may be secured to another surface or structure by the adhesive straps or placed on a surface in close proximity to the camera at the option of the operator.

When the cable is properly coupled to the box housing its core is aligned with an electronically controlled piston mechanism inside the box housing. The piston mechanism moves back and forth according to preprogrammed electronic commands from an electronic microcomputer, thereby driving the cable's core to activate the shutter release of the camera attached thereto or the cable release plunger mechanism attached thereto and subsequently allowing the shutter or plunger to reset. The length of the piston stroke is adjustable which serves to accommodate instances when a longer and more powerful piston stroke is required to overcome the resistance offered by some cameras in their shutter release mechanisms. The electronic circuits that control the piston mechanism are responsive to a wireless remote control and are also responsive to control buttons attached to the box housing. The circuits may be programmed to add an accurate time delay to the piston mechanism, to provide an accurately controlled time lapse sequence to the piston mechanism, to provide an accurately controlled time exposure sequence to the piston mechanism and to provide a controlled number of repetitions of its control sequences.

The control circuits also open and close an electronic switch in unison with the piston mechanism commands. This electronic switch may be connected to a camera, equipped to receive an external switch control for its shutter release, through an outlet jack on the box housing. If the cable release cable is removed from its docking port on the box housing, a sensor switch causes the piston mechanism to be inactive but continues to allow the electronic switch to be active according the commands from the electronic control circuits. This feature serves to eliminate any mechanical vibration that may be caused by the movement of the piston when the camera is being operated electronically and the piston movement is not required to achieve the desired results.

The electronic control circuits are also responsive to an externally hard wired switch which may be connected by a jack on the box housing. An external event actuating this external switch causes the control circuits to be activated in the same fashion as though the activation was by the wireless remote control or the buttons on the box housing. The connection of an external switch causes the control circuits to be non-responsive to the wireless remote control but still responsive to the buttons on the box housing. This feature serves to allow the operator the option to lock out the wireless remote control and allow only the external event or the buttons on the box housing to provide the activation.

Visual display devices and control buttons on the front face of the box housing allow the operator to set and monitor the programming of the electronic control circuits. A prominent final countdown display eliminates the guesswork of when the counting circuits reach the activation point. An indicator shows when a sequence has been started. Batteries housed inside the box housing provide the power to operate the invention's electrical components.

The remote control transmitter is a small hand held device contained in a small housing with all the necessary circuitry and power supply. It is activated by the pushing of a button suitably mounted on its top face.

Other principal features and advantages of the invention will become apparent to those skilled in the art upon review of the following detailed description, claims and drawings.

BRIEF DESCRIPTION OF DRAWINGS

FIG. 9 is a perspective view of the circuit board with some of its components attached.

FIG. 10 is a sectional view of a leg sleeve and an inserted leg showing the keyways.

FIG. 11 is an exploded view in perspective showing the bracket components and plunger housing.

DETAILED DESCRIPTION

Figure 1:
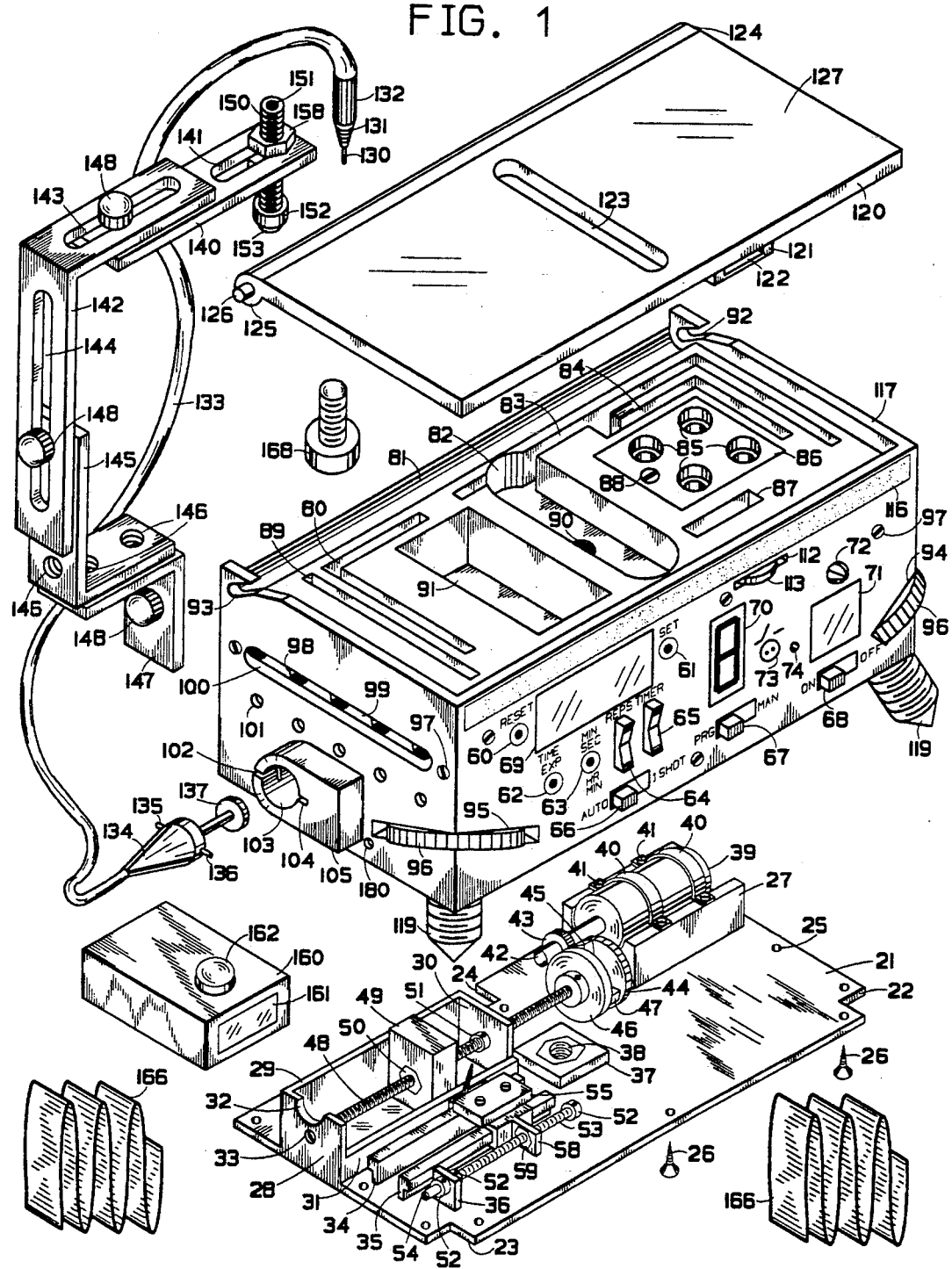
FIG. 1 is a perspective view partially fragmented to show components of the invention.
Figure 6:
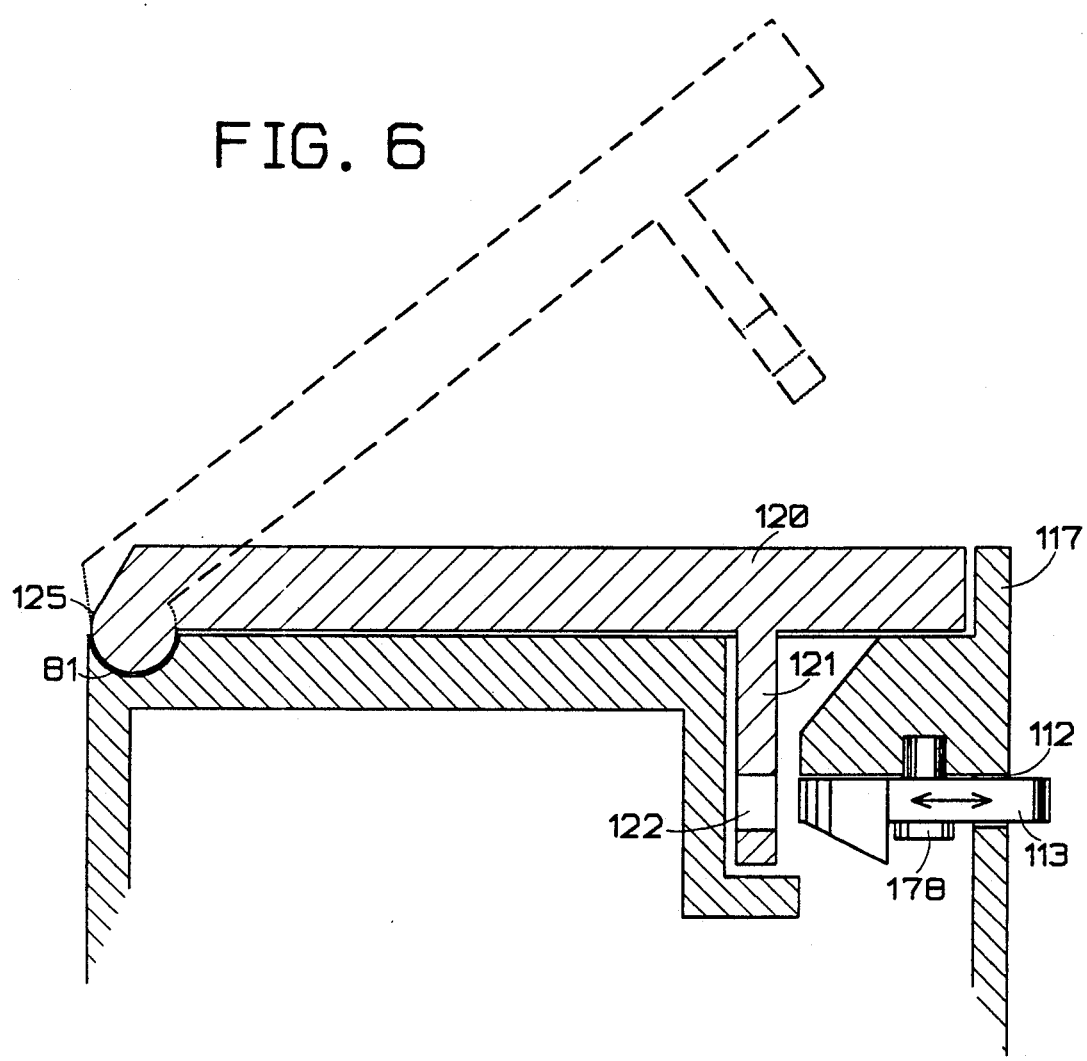
FIG. 6 is a sectional view of the enclosure and lid taken on line 6—6.

A device made in accordance with the present invention is shown in a partially fragmented illustration in FIG. 1. A housing enclosure 117 of a generally rectangular shape made of a strong, rigid and lightweight material has a top face recessed to receive a lid 120. Housing enclosure 117 is of a size and weight which allows it to be carried in a photographer's accessory case. Hinge pins 124 and 126 protruding the ends of lid 120 are guided along hinge channels 92 and 93 allowing hinge cylinder 125 to seat in a concavity 81 on the top rear face of enclosure 117 as shown in FIG. 6. FIG. 1 and FIG. 6 shows a lid tongue 121 which projects off the lower face of lid 120 and docks into opening 87 when lid 120 is rotated towards the top face of enclosure 117. The broken lines in FIG. 6 show the lid 120 in a raised position. Latch disk 113 is a metallic disk with a protruding inclined spiral cam which rotates into tongue keyway 122 and secures lid 120 to the top face of enclosure 117. Disk 113 is attached to enclosure 117 with disk retaining pin 178 and protrudes partially through the front face of enclosure 117 via latch disk portal 112.

Figure 12:
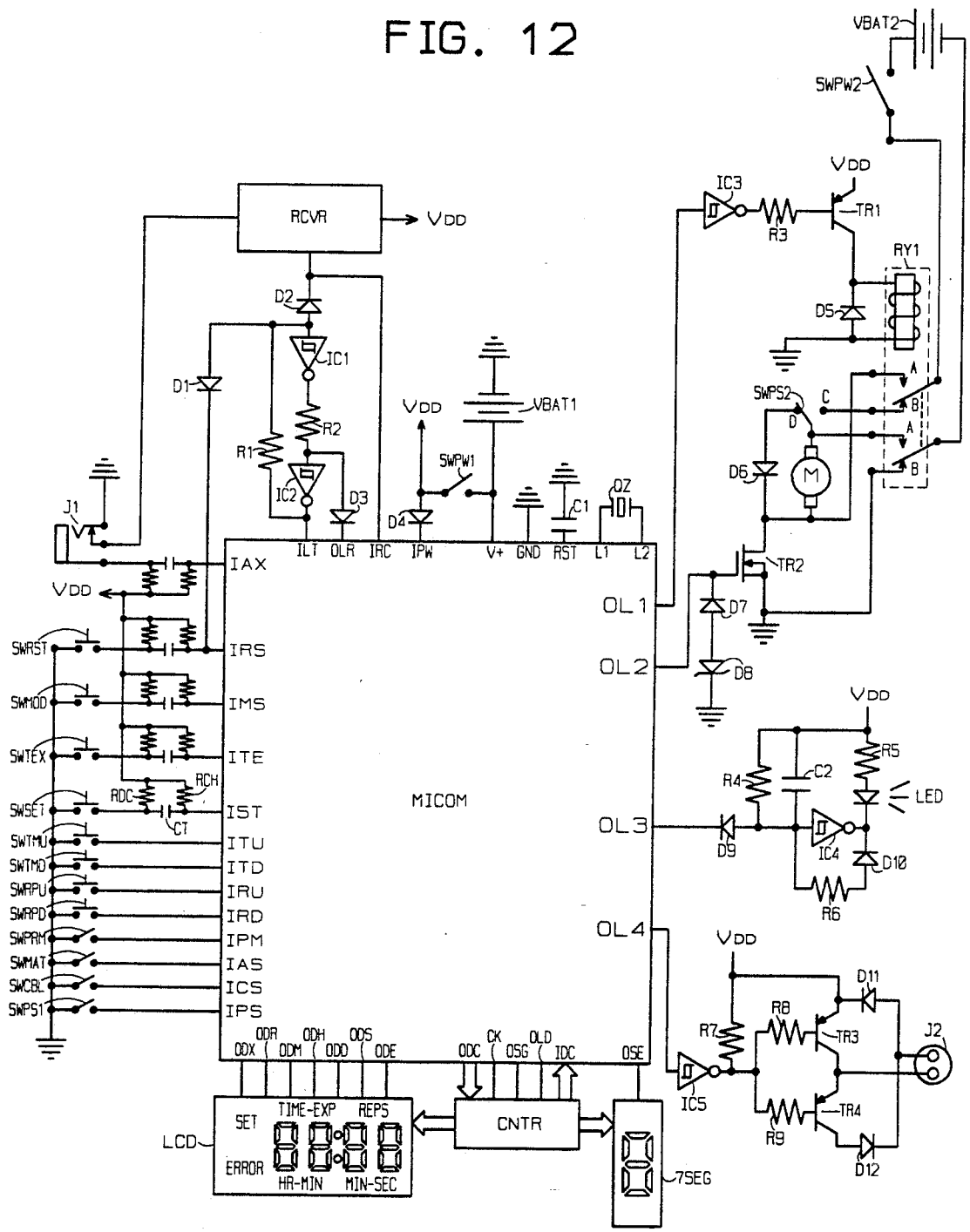
FIG. 12 is an electrical schematic layout of the electrical components.

FIG. 1 and FIG. 9 show push button switches 60, 61, 62 and 63, rocker switches 64 and 65, slide switches 66, 67 and 68, jacks 73 and 74, liquid crystal display 69, 7 segment light emitting diode (LED) display 70, light emitting diode 72 as well as receiver 71 which are all mounted on circuit board 76 and protrude through properly aligned portals in front face of enclosure 117. Connecting wire 184 is electrically connected to batteries VBAT1 and VBAT2, shown in FIG. 12, housed in battery compartment 177 shown in FIG. 3. Battery compartment 177 is a rectangular shaped enclosure molded as part of enclosure 117 projecting toward the inside of enclosure 117. Battery compartment lid 86 has bolt compartments 85 molded into lid 86 shaped to receive bracket bolts 148 for storage when not in use. Lid 86 is screwably secured to enclosure 117 with lid screw 88 so as to be flush and even with the top face of enclosure 117. Microcomputer 75 is mounted on circuit board 76 and properly connected to components as shown in FIG. 12. Components also mounted on the circuit board 76 include R1, R2, R3, R4, R5, R6, R7, R8, R9, RCH, RDC, C1, C2, CT, IC1, IC2, IC3, IC4, IC5, TR1, TR2, TR3, TR4, D1, D2, D3, D4, D5, D6, D7, D8, D9, D10, D11, D12, QZ, RY1, J1 and J2. Circuit board 76 is secured to the inside of enclosure 117 with screws 97.

Figure 2:
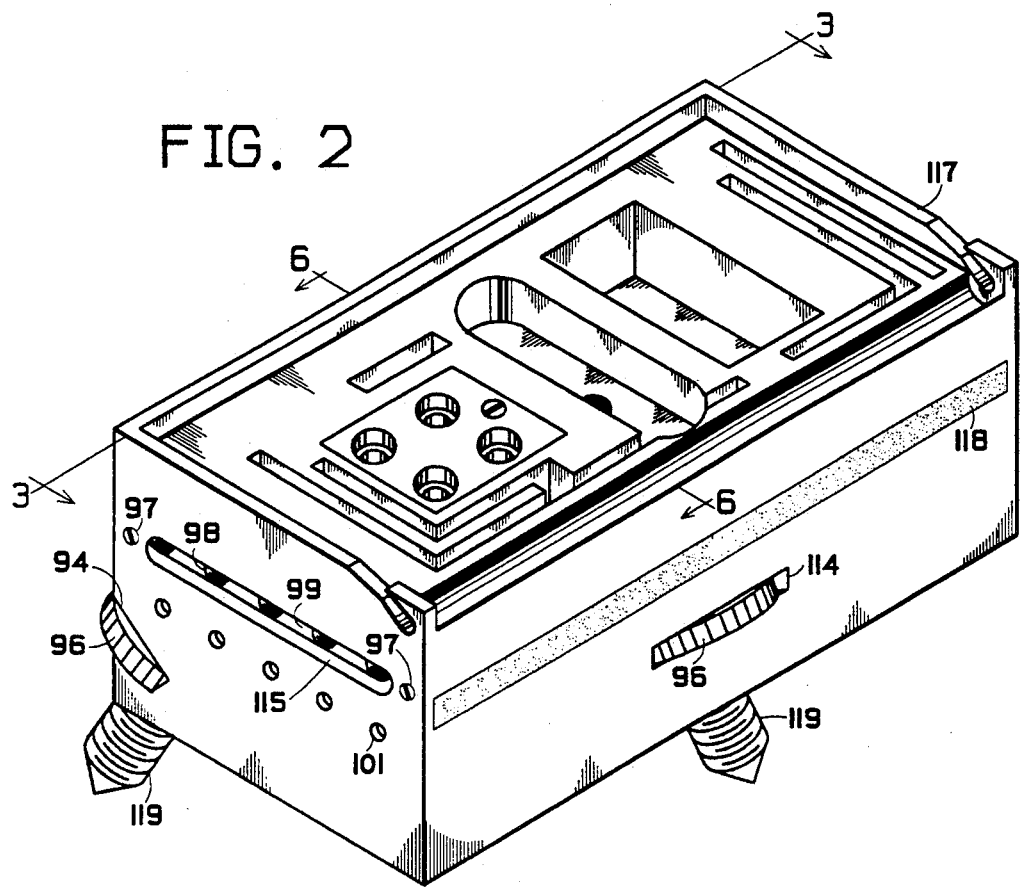
FIG. 2 is a perspective view of the back face of the enclosure without the enclosure lid attached.
Figure 3:
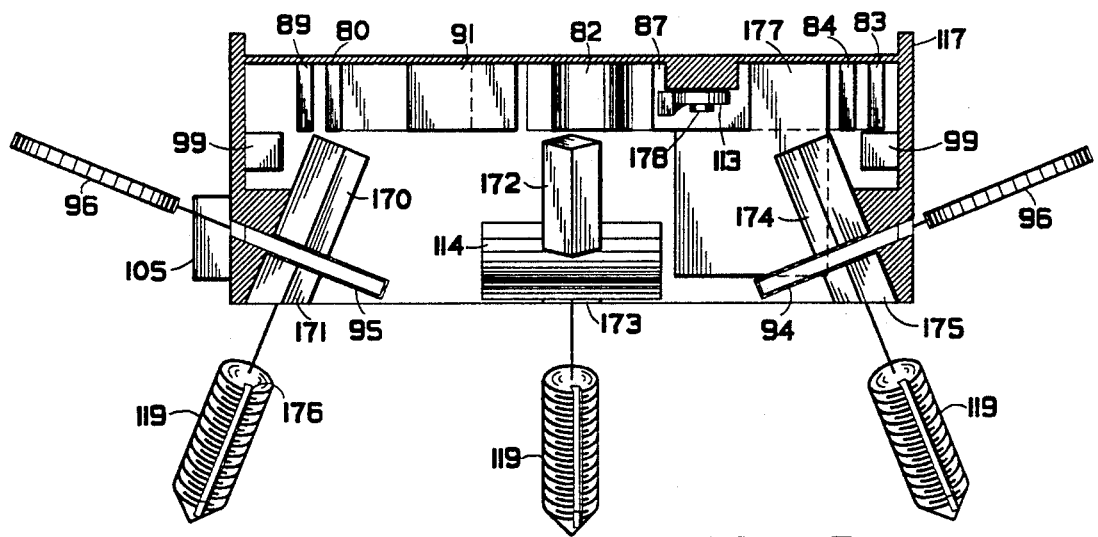
FIG. 3 is a sectional view in front elevation taken on line 3—3 in FIG. 2, with the legs and disks exploded.

FIG. 1, FIG. 2 and FIG. 3 shows three threaded legs 119 and leg sleeves 170, 171, 172, 173, 174 and 175 into which the legs 119 are inserted. Disk sleeves 95, 94 and 114 respectively intersect the leg sleeves 170, 171, 172, 173, 174 and 175 and are receptacles for threaded disks 96. Disks 96 are rotated and threadably receive and adjust legs 119.

FIG. 3 and FIG. 10 show a keyway 176 in legs 119 which slides along sleeve key 179 to prevent legs 119 from rotating. Key 179 runs along the length of leg sleeves 170, 171, 172, 173, 174 and 175.

Figure 7:
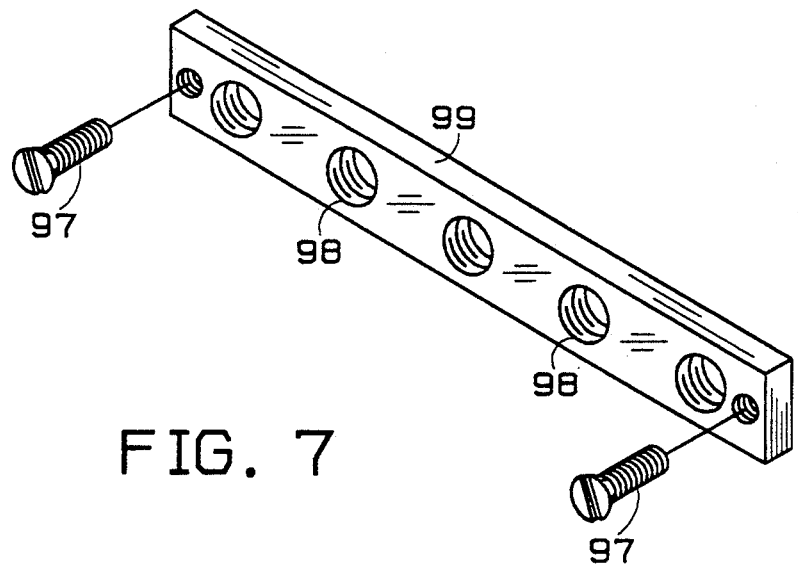
FIG. 7 is a perspective view of the rectangular bar with its threaded portals and securing screws.

FIG. 1 shows the left face of enclosure 117 with an elongated aperture 100 allowing rectangular bar 99, shown in FIG. 7, with its threaded apertures 98 to be accessible through the aperture 100. Rectangular bar 99 is secured to the inside of enclosure 117 with screws 97.

FIG. 2 shows the right face of enclosure 117 with an elongated aperture 115 allowing rectangular bar 99, shown in FIG. 7, with its threaded apertures 98 to be accessible through the aperture 115. As is the case on the left face of enclosure 117 rectangular bar 99 is secured to the inside of enclosure 117 with screws 97.

FIG. 1 and FIG. 2 show on both the left and right face of enclosure 117 key holes 101 bored into enclosure 117 and aligned beneath threaded apertures 98. Also shown in FIG. 1 and FIG. 2 are latching strips 116 and 118 of the hook and latch type which are adhered lengthwise to the front and back faces of enclosure 117.

Figure 5:
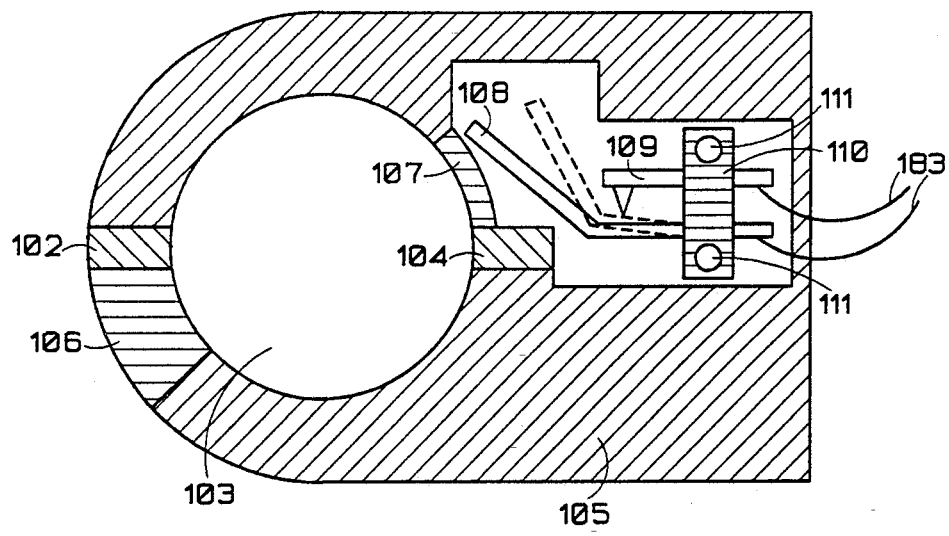
FIG. 5 is a sectional view of the shoe housing.

FIG. 1 and FIG. 5 shows shoe housing 105 as an enclosure projecting from the left face of enclosure 117 with an aperture 103 extending through to the inside of enclosure 117. Keyways 102 and 104 intersect opposite sides of aperture 103 extending a partial length of aperture 103 and terminating at keyways 106 and 107 respectively. Keyways 106 and 107 are perpendicular to keyways 102 and 104 and axial about aperture 103 extending partially about its perimeter. Leaf switch 110 is secured with mounting holes 111 in a cavity within shoe housing 105 with leaf switch member 108 adjacent to keyway 107. Broken lines in FIG. 5 show leaf switch member 108 in a closed circuit position with leaf switch member 109. Connecting wires 183 connect the leaf switch members 108 and 109 to circuit board 76 shown in FIG. 9.

Figure 4:
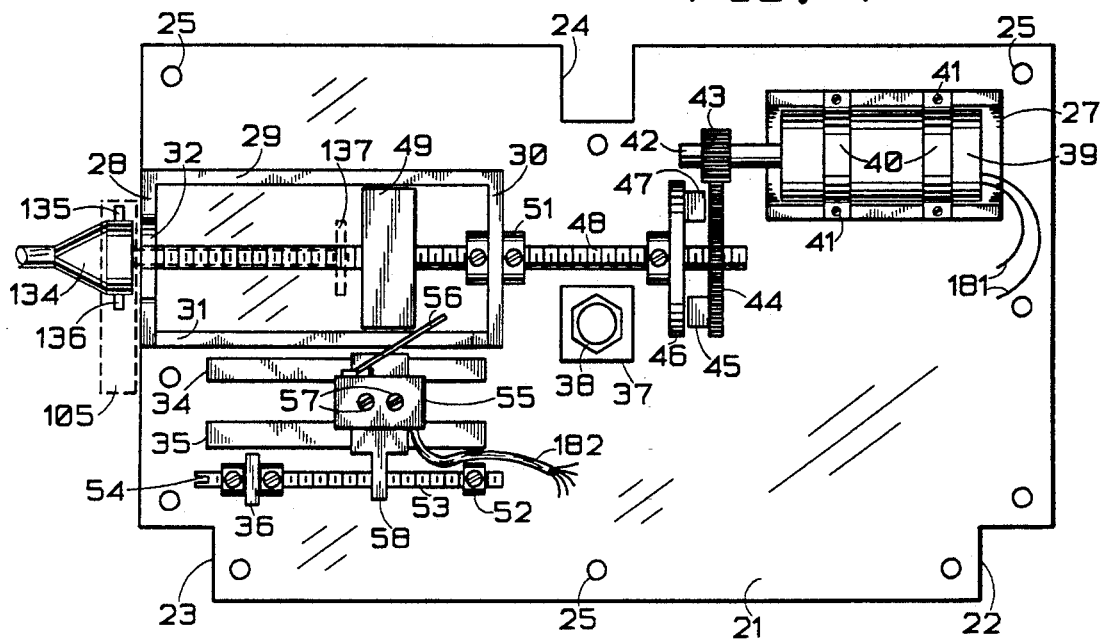
FIG. 4 is a top plan view of base platform components mounted thereon showing the relative position of a docked cable release.

As shown in FIG. 1 and FIG. 4 the bottom face of enclosure 117 comprises a base platform 21 which is secured to enclosure 117 with screws 26 through holes 25 and terminating in enclosure 117 so that the bottom face of base platform 21 is flat and even with enclosure 117. Molded to base platform 21 is motor cradle 27 which is a rectangular box with a semicircular cutout in which motor 39 is secured by semicircular clamps 40 screwably secured to cradle 27 with screws 41. Motor shaft 42 has drive gear 43 secured thereto which is enmeshed in gear 44 such that a rotation of motor shaft 42 causes a rotation of gear 44. Gear 44 has at its center a threaded portal through which threaded shaft 48 is threaded. Facing gear 44 is disk 46 which is securely attached to threaded shaft 48 with an attached set screw. Gear 44 is equipped with a cam 45 protruding from its face. Gear 44 rotates freely in either direction on threaded shaft 48 only until its cam 45 meets cam 47 attached to disk 46. When cams 45 and 47 meet, any further rotation by gear 44 in the same direction as that which caused the cams 45 and 47 to meet will result in a rotation of disk 46 and subsequent rotation of attached threaded shaft 48 in the same direction. From that position if gear 44 is caused to rotate in the opposite direction it will rotate freely on threaded shaft 48 until its cam 45 again meets cam 47 on disk 46. At that position any further rotation of gear 44 will result in a rotation of disk 46 and subsequent rotation of threaded shaft 48 in the same direction. Threaded shaft 48 extends through the centers of gear 44 and disk 46 and through a portal in enclosure wall 30 to terminate in aperture 33 in enclosure wall 28. Enclosure walls 30, 29, 28 and 31 are upright walls molded to base platform 21 to form an generally rectangular enclosure for piston 49 which moves along threaded shaft 48 within the confines of the enclosure walls 30, 29, 28 and 31. Piston 49 is a rectangular block of a hard and dense, solid material. It has at a point partway along its face an imbedded nut 50. Piston 49 is sized so that its bottom face is in close proximity to base platform 21 and its side faces are in close proximity to enclosure walls 29 and 31. This ensures that the piston 49 will not itself rotate about the threaded shaft 48 but instead will be moved along the length of threaded shaft 48 as threaded shaft 48 rotates through nut 50. Enclosure wall 28 has a semicircular cutout 32 which allows cable core piston 137 to pass through and be aligned in the path of piston 49. Enclosure wall 31 is partially cut away to allow switch lever 56 to extend into the enclosure area and be intersected by piston 49 at a designated position along the path of piston 49. Switch 55 of which switch lever 56 is a component is mounted upon switch carriage 58 by switch screws 57. Switch carriage 58 is a hollow, generally rectangular housing which fits around upright L-shaped tracks 34 and 35 in close proximity. Switch carriage 58 has a protruding member in which is imbedded a nut 59 through which a threaded shaft 53 is threaded. Threaded shaft 53 is supported by upright strut 36, molded to the base platform 21, and has an aperture to receive a first end of threaded shaft 53. Collars 52 are secured with their set screws to threaded shaft 53 on either side of and in close proximity to upright strut 36. This allows threaded shaft 53 to rotate freely but prevents its longitudinal movement. A slot 54 in the first end of threaded shaft 53 allows a tool to be inserted into the slot 54 and subsequently rotate the threaded shaft 53. Such a tool may be inserted through portal 180 on the left face of enclosure 117 as shown in FIG. 1. The rotation of threaded shaft 53 causes the switch carriage 58 to move along the length of threaded shaft 53 and will thereby also move along the tracks 34 and 35 and subsequently move the switch 55 along the length of enclosure wall 31. The distance that piston 49 can travel between switch lever 56 and enclosure wall 28 is therefore adjusted with the rotation of threaded shaft 53. A collar 52 is secured with its set screw to the second end of threaded shaft 53 to act as a stopper and set a limit to the distance the switch carriage 58 may travel towards the second end of threaded shaft 53. Nut shell 37 is a rectangular platform molded to base platform 21 which is a shell for imbedded nut 38.

Nut 38 is of a size that will accommodate the standard sized tripod screw as is well known in the art. Cutouts 22, 23 and 24 allow the base platform 21 to be secured to the housing enclosure 117 and permit the insertion of threaded legs 119 into their respective sleeves. Connecting wire 181 connects the motor electrically to the circuit board 76 shown in FIG. 9. Connecting wire 182 connects the contacts of switch 55 electrically to the circuit board 76 shown in FIG. 9.

FIG. 1, FIG. 11, FIG. 14 and FIG. 15 show adjustable bracket components made of strong and rigid metal in assembled and exploded views. Rectangular bracket arm 140 connects to angular bracket arm 142 which connects to angular bracket arm 145 which connects to angular bracket arm 147 via bracket bolts 148 to achieve the desired shape. Bracket bolts 148 thread into threaded bracket portals 146 through bracket apertures 143, 144 and 149 to effect securement of the components into the desired shape. Bracket components 140, 142, 145, 147 and 148 may also be assembled together in any configuration desired to achieve the desired shape and effect. Bracket components 140, 142, 145, 147 and 148 may be placed in compartments 89, 83, 80, 84 and 85 respectively for storage when not in use. Compartments 89, 83, 80, 84 and 85 are of sufficient depth to fully receive their respective bracket components. Angular bracket arm 147 has on one of its arms a non threaded portal 157 and aligned with it at the end of the same arm is a protruding cylindrical key 159. Cylindrical key 159 is inserted into one of key holes 101 in housing enclosure 117 and a bolt 148 is inserted through non threaded portal 157 and threaded into an aligned threaded aperture 98 of rectangular bar 99 through aperture 100 thereby securing angular bracket arm 147 to housing enclosure 117 in a manner which prevents rotational movement of angular bracket arm 147 with respect to housing enclosure 117. A thin coating of a frictive material such as rubber or cork may be applied to the surfaces of bracket arms 140, 142, 145 and 147 to assist their securement to each other. Plunger assembly housing 150 is secured to rectangular bracket arm 140 with plunger nuts 158 threaded on housing 150 on both sides of bracket arm 147 with housing 150 inserted through bracket aperture 141. The depth of insertion of housing 150 through aperture 141 is adjustable according to the position of nuts 158 on the housing 150. The housing 150 may also be secured through aperture 143 or aperture 144 on bracket arm 142 in a like fashion to achieve the desired configuration. Plunger housing 150 and nuts 158 may be placed in storage compartment 91 for storage when not in use.

Figure 8:
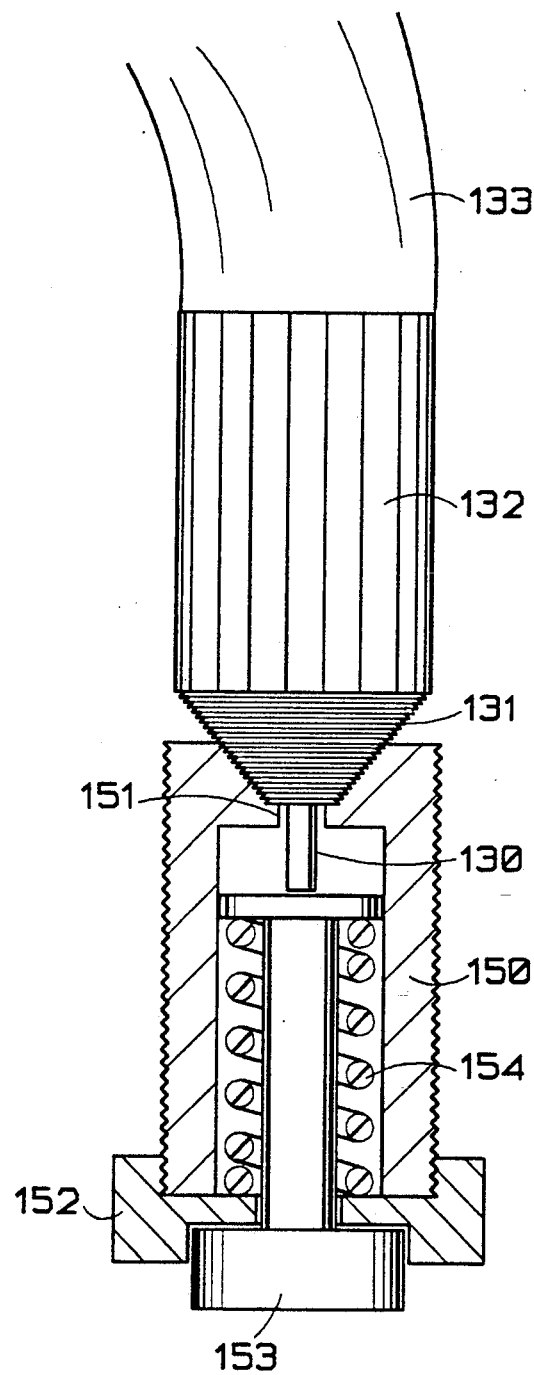
FIG. 8 is a sectional view of the plunger housing showing its contents and with a cable release attached.

FIG. 1, FIG. 8, FIG. 14 and FIG. 15 show cable release cable 133. Such cables are well known in the art. Cable 133 has on its cable neck 134 coupling pins 135 and 136 which are aligned with keyways 102 and 104 on shoe housing 105 and inserted into the keyways 102 and 104 and rotatably docked along keyways 106 and 107 shown in FIG. 5. FIG. 5 shows in broken lines leaf switch member 108 in a closed circuit position with leaf switch member 109 which is the position of leaf switch member 108 when cable neck 134 is docked as described above. When this docking is not in effect leaf switch member 108 springs back to the open circuit position shown by the solid lines. This docking moves cable core piston 137 through aperture 103 and aligned in the path of piston 49 as shown in FIG. 4. Broken lines in FIG. 4 show the position of shoe housing 105 in relation to enclosure wall 28 and the relative position of a properly inserted cable neck 134 in aperture 103 and the relative position of cable core piston 137 of a properly inserted cable neck 134. FIG. 8 shows cable neck 132 of cable 133 threaded into threaded inlet 151 on plunger housing 150. Cable core 130 is aligned with plunger piston 153 which is retained by threaded enclosure cap 152. Piston 153 is forced to a position closest to the inlet 151 by spring 154 until cable core 130 forces the plunger piston 153 to an extended position.

Figure 14:
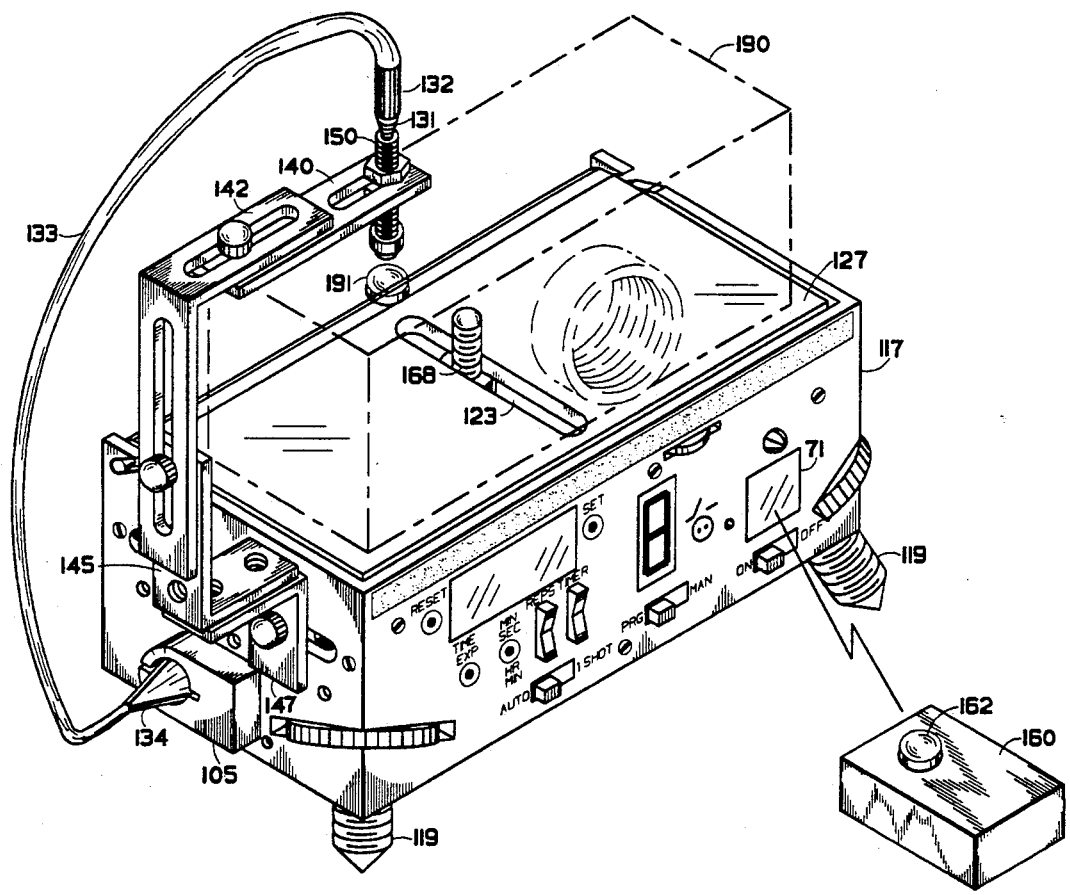
FIG. 14 is a perspective view of the invention with one type of camera secured to its top face with a screw.
Figure 15:
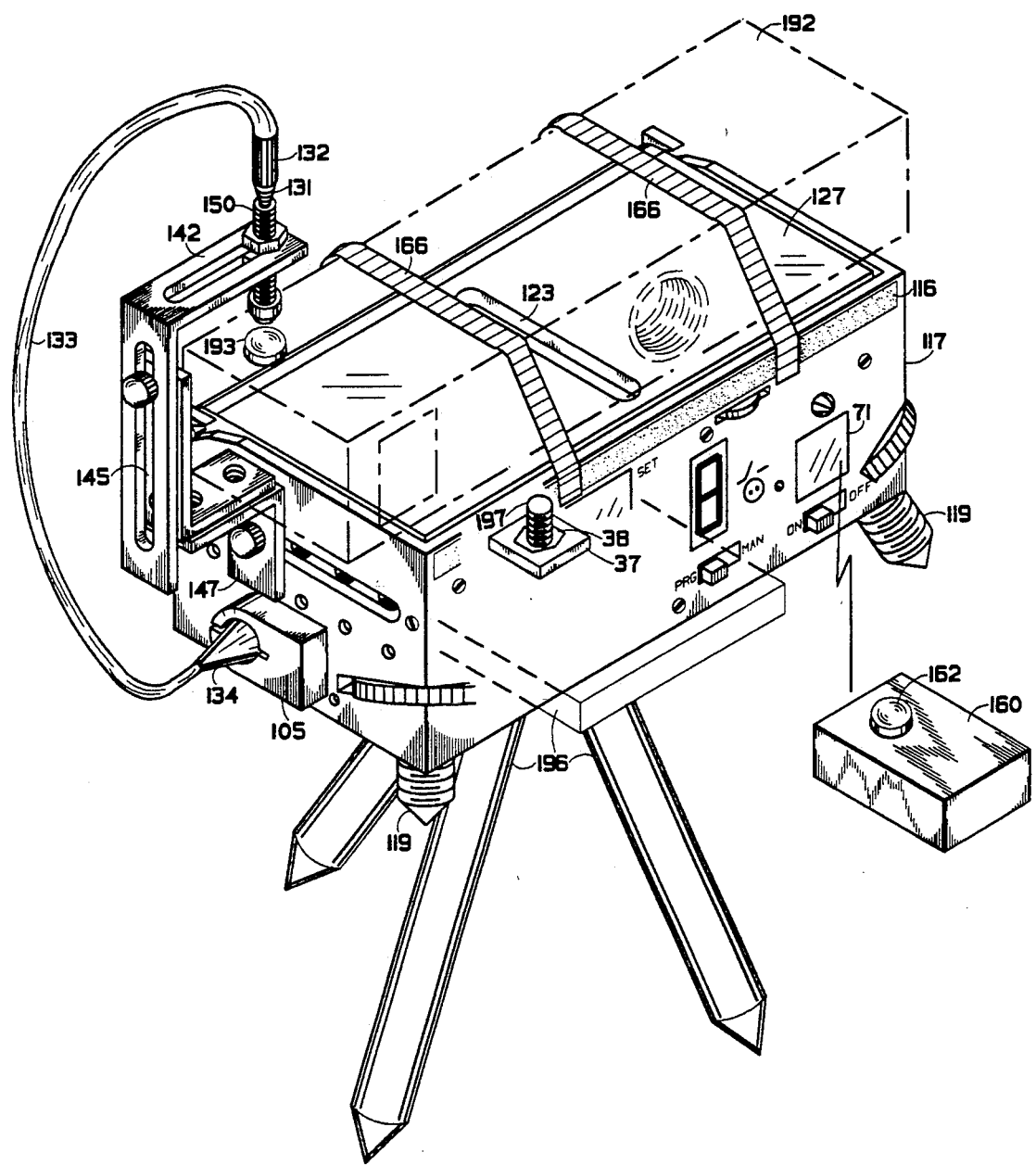
FIG. 15 is a perspective view of the invention with one type of camera secured to its top face with the latching straps and its connection to a tripod.

FIG. 14 shows a camera 190, in broken lines, mounted upon lid platform 127 using bolt 168 inserted through channel 123 and threading into camera 190. Bracket components 140, 142, 145 and 147 are assembled to align plunger assembly housing 150 over shutter release button 191. Cable neck 134 is docked in shoe housing 105. Cable neck 132 is coupled to plunger housing 150 with coupling threads 131. The housing enclosure 117 is shown being supported by legs 119. The housing enclosure 117 with the configuration shown in FIG. 14 may also be supported by a tripod as shown in FIG. 15. Transmitter 160 is shown with its push button switch 162 on its top face.

FIG. 15 shows a camera 192 in broken lines, of a different style than camera 190, secured to housing enclosure 117 and lid platform 127 by latching straps 166. Latch strip 116 on the front face of housing enclosure 117 and latch strip 118 on the rear face of housing enclosure 117 as shown in FIG. 2 are the latching points for latching straps 166. Camera 192 is of the style that does not have a standard tripod mount as known in the art. Housing enclosure 117 is shown mounted on tripod 196 with tripod mounting bolt 197 threaded into nut 38 imbedded in shell 37. The housing enclosure 117 with the configuration shown in FIG. 15 may also be supported by legs 119 without the tripod 196. Latching straps 166 may be placed in storage compartment 91 for storage when not in use.

The descriptive lettering shown on the front face of enclosure 117 in FIG. 1, FIG. 14, FIG. 15 and FIG. 16 comprising RESET, SET, TIME EXP, MIN SEC, HR MIN, REPS, TIMER, AUTO, 1 SHOT, PRG, MAN, ON, OFF and the symbol denoting a switch are shown as one possible means of describing the functions of the respective components by which the lettering is shown.

The following legend describes components in electrical schematic diagram FIG. 12 and their relationship to reference numerals (REF) used in the parts list, drawings and text.

| FIG. 12 | DESCRIPTION | REF | TYPE |
|---------|-------------|-----|------|
| SWRST | RESET SWITCH | 60 | SPST PUSH BUTTON |
| SWSET | SET SWITCH | 61 | SPST PUSH BUTTON |
| SWTEX | TIME EXPOSURE SWITCH | 62 | SPST PUSH BUTTON |
| SWMOD | MINUTE/SECOND MODE SWITCH | 63 | SPST PUSH BUTTON |
| SWRPU | REPETITIONS UP SWITCH | 64 | SPST ROCKER |
| SWRPD | REPETITIONS DOWN SWITCH | 64 | SPST ROCKER |
| SWTMU | TIMER UP SWITCH | 65 | SPST ROCKER |
| SWTMD | TIMER DOWN SWITCH | 65 | SPST ROCKER |
| SWMAT | AUTO/ONE SHOT SWITCH | 66 | SPST SLIDE |
| SWPRM | PROGRAM/MANUAL SWITCH | 67 | SPST SLIDE |
| SWPW1 | POWER SWITCH | 68 | DPDT SLIDE |
| SWPW2 | POWER SWITCH | 68 | DPDT SLIDE |

-continued

| | | | |
|---|---|---|---|
| SWPS1 | PISTON SWITCH | 55 | DPDT SNAP |
| SWPS2 | PISTON SWITCH | 55 | DPDT SNAP |
| SWCBL | SHOE HOUSING SWITCH | 110 | SPST LEAF |
| MICOM | MICROCOMPUTER | 75 | |
| RCVR | RECEIVER | 71 | |
| LCD | LIQUID CRYSTAL DISPLAY | 69 | |
| 7SEG | 7 SEGMENT LED DISPLAY | 70 | |
| LED | LIGHT EMITTING DIODE (LED) | 72 | |
| J2 | 2 ELEMENT JACK | 73 | |
| J1 | CLOSED CIRCUIT JACK | 74 | |
| M | MOTOR | 39 | |

| PARTS LIST WITH REFERENCE CHARACTERS | | | |
|---|---|---|---|
| R1 | RESISTOR | R2 | RESISTOR |
| R3 | RESISTOR | R4 | RESISTOR |
| R5 | RESISTOR | R6 | RESISTOR |
| R7 | RESISTOR | R8 | RESISTOR |
| R9 | RESISTOR | | |
| RCH | CHARGE RESISTOR | | |
| RDC | DISCHARGE RESISTOR | | |
| CT | TIMING CAPACITOR | | |
| C1 | RESET CAPACITOR | | |
| C2 | TIMING CAPACITOR | | |
| IC1 | INVERTER WITH SCHMITT TRIGGER | | |
| IC2 | INVERTER WITH SCHMITT TRIGGER | | |
| IC3 | INVERTER WITH SCHMITT TRIGGER | | |
| IC4 | INVERTER WITH SCHMITT TRIGGER | | |
| IC5 | INVERTER WITH SCHMITT TRIGGER | | |
| TR1 | NPN TRANSISTOR | | |
| TR2 | MOSFET TRANSISTOR | | |
| TR3 | NPN TRANSISTOR | | |
| TR4 | NPN TRANSISTOR | | |
| D1 | DIODE | D2 | DIODE |
| D3 | DIODE | D4 | DIODE |
| D5 | DIODE | D6 | DIODE |
| D7 | DIODE | D8 | ZENER DIODE |
| D9 | DIODE | D10 | DIODE |
| D11 | DIODE | D12 | DIODE |
| QZ | CRYSTAL OSCILLATOR | | |
| RY1 | DPDT RELAY | | |
| VBAT1 | BATTERY | | |
| VBAT2 | BATTERY | | |
| 21 | base platform | 22 | cutout |
| 23 | cutout | 24 | cutout |
| 25 | hole (qty 10) | 26 | screw (qty 10) |
| 27 | motor cradle | 28 | enclosure upright wall |
| 29 | enclosure upright wall | 30 | enclosure upright wall |
| 31 | enclosure upright wall | 32 | cutout |
| 33 | aperture | 34 | L-shaped track |
| 35 | L-shaped track | 36 | strut with aperture |
| 37 | nut shell | 38 | nut |
| 39 | motor | 40 | clamp (qty 2) |
| 41 | clamp screw (qty 4) | 42 | motor shaft |
| 43 | drive gear | 44 | threaded gear with cam |
| 45 | cam | 46 | disk with cam |
| 47 | cam | 48 | threaded shaft |
| 49 | piston | 50 | nut |
| 51 | collar with set screw | 52 | collar with set screw |
| 53 | threaded shaft | 54 | slot |
| 55 | switch | 56 | switch lever |
| 57 | switch screw (qty 2) | 58 | switch carriage |
| 59 | nut | 60 | push button switch |
| 61 | push button switch | 62 | push button switch |
| 63 | push button switch | 64 | rocker switch |
| 65 | rocker switch | 66 | slide switch |
| 67 | slide switch | 68 | slide switch |
| 69 | liquid crystal display | 70 | 7-segment LED display |
| 71 | receiver | 72 | light emitting diode |
| 73 | jack | 74 | jack |
| 75 | microcomputer | 76 | circuit board |
| 77-79 | not used | 80 | bracket compartment |
| 81 | concavity | 82 | bolt channel |
| 83 | bracket compartment | 84 | bracket compartment |
| 85 | bolt compartment (qty 4) | 86 | battery compartment lid |

-continued

| | | | |
|---|---|---|---|
| 87 | opening | 88 | lid screw |
| 89 | bracket compartment | 90 | threaded portal |
| 91 | storage compartment | 92 | hinge channel |
| 93 | hinge channel | 94 | disk sleeve |
| 95 | disk sleeve | 96 | threaded disk (qty 2) |
| 97 | mounting screw (qty 8) | 98 | threaded aperture |
| 99 | rectangular bar (qty 2) | 100 | aperture |
| 101 | key hole | 102 | keyway |
| 103 | aperture | 104 | keyway |
| 105 | shoe housing | 106 | keyway |
| 107 | keyway | 108 | leaf switch member |
| 109 | leaf switch member | 110 | leaf switch |
| 111 | mounting hole | 112 | latch disk portal |
| 113 | latch disk | 114 | disk sleeve |
| 115 | aperture | 116 | latching strip |
| 117 | housing enclosure | 118 | latching strip |
| 119 | threaded leg (qty 3) | 120 | lid |
| 121 | lid tongue | 122 | tongue keyway |
| 123 | channel | 124 | hinge pin |
| 125 | hinge cylinder | 126 | hinge pin |
| 127 | lid platform | 130 | cable core |
| 131 | cable coupling threads | 132 | cable neck |
| 133 | shutter release cable | 134 | cable neck |
| 135 | coupling pin | 136 | coupling pin |
| 137 | cable core piston | 140 | rectangular bracket arm |
| 141 | bracket aperture | 142 | angular bracket arm |
| 143 | bracket aperture | 144 | bracket aperture |
| 145 | angular bracket | 146 | threaded bracket portal |
| 147 | angular bracket arm | 148 | bracket bolt (qty 4) |
| 149 | bracket aperture | 150 | plunger assembly housing |
| 151 | threaded coupling inlet | 152 | threaded enclosure cap |
| 153 | plunger piston | 154 | spring |
| 157 | bracket portal | 158 | plunger nut (qty 2) |
| 159 | cylindrical key | 160 | transmitter |
| 161 | lens plate | 162 | push button switch |
| 163-165 | not used | 166 | latching strap |
| 167 | not used | 168 | bolt |
| 169 | not used | 170 | leg sleeve |
| 171 | leg sleeve | 172 | leg sleeve |
| 173 | leg sleeve | 174 | leg sleeve |
| 175 | leg sleeve | 176 | keyway |
| 177 | battery compartment | 178 | disk retaining pin |
| 179 | sleeve key | 180 | adjusting aperture |
| 181 | connecting wire | 182 | connecting wire |
| 183 | connecting wire | 184 | connecting wire |
| 185-189 | not used | 190 | camera with mount |
| 191 | shutter release button | 192 | camera without mount |
| 193 | shutter release button | 194 | camera with cable mount |
| 195 | shutter release button | 196 | tripod |
| 197 | tripod mounting bolt | | |

OPERATION

Microcomputer 75, being MICOM shown in FIG. 12, has the following input ports which have a default HIGH state which means that without a LOW state directed to them they will automatically revert to the HIGH state: IRC, ILT, IAX, IRS, IMS, ITE, IST, ITU, ITD, IRU, IRD, IPM, IAS, ICS and IPS. A HIGH state refers to a voltage level at or near VDD and a LOW state refers to a voltage level at or near electrical ground GND in the circuit as is well known in the art.

The output ports from MICOM to the display LCD serve the functions on display LCD as follows:

port ODX at a HIGH state turns on TIME-EXP signifier port ODX at a LOW state turns off TIME-EXP signifier port ODR at a HIGH state turns on REPS signifier port ODR at a LOW state turns off REPS signifier port ODM at a HIGH state turns on MIN-SEC signifier port ODM at a LOW state turns off MIN-SEC signifier port ODH at a HIGH state turns on HR-MIN signifier port ODH at a LOW state turns off HR-MIN signifier port ODD at a HIGH state turns on digit elements port ODD at a LOW state turns off digit elements port ODS at a HIGH state turns on SET signifier port ODS at a LOW state turns off SET signifier port ODE at a HIGH state turns on ERROR signifier port ODE at a LOW state turns off ERROR signifier Display LCD receives digital count data from digital counter CNTR and displays the data as digit elements when port ODD is at a HIGH state as described above.

Digital counter CNTR counts in a clock style mode with a 60 count in its units and tens buffer. This type of counter is well known in the art.

Digital counter CNTR feeds the contents of its count to input port IDC on MICOM and also to display 7SEG. Display 7SEG is only responsive to data representing the units count.

Output port OLR is has a default HIGH state and is used to set the output of inverter IC2, being a component of a latch circuit described herein, when it is directed to a LOW state by the applicable program steps.

Output ports OL1, OL2, OL3 and OL4 have default LOW states. Input port IPW has a default LOW state.

Ports L1 and L2 are connected to a crystal oscillator QZ to provide a clock pulse to MICOM which is divided down to the appropriate speed by MICOM for use by circuit components. Steps 60, 61, 92 and 93 shown in FIG. 13(B) provide for a setting of counter CNTR clock CK speed. Where CCK=F is designated the clock CK is provided with clock pulses yielding a new count every 1 second. Where CCK=S is designated the clock CK is provided with clock pulses yielding a new count every 60 seconds.

Display LCD, counter CNTR and display 7SEG are all configured electrically with necessary power, clock and ground as required for their operation as is well known in the art.

Resistors RDC, RCH and capacitor CT, as configured in FIG. 12 shown connected to port IST and switch SWSET, provide a predetermined brief duration LOW state to port IST when SWRSET is closed. The opening of switch SWSET allows the circuit to reset itself during which time a further closing of switch SWSET will not have the effect of providing a LOW state pulse to port IST. This has the effect of maximizing the duration of the predetermined brief low state pulse and providing a lock out duration for switch SWSET for the purposes of being properly configured with the timing of circuits and programming of microcomputer MICOM. Circuits of this type are well known in the art. Circuits of similar configuration as described above and connected to port IST are also connected to ports ITE, IMS, IRS and IAX.

The duration of the brief duration Low sate pulse produced by circuits connected to ports IST, ITE, IXS, IRS and IAX as described above is equal in duration to the amount of time required for a flow of program steps as herein described in their longest possible continuous loop before repeating itself. Such a loop comprises step START, step 1, step 2, step 4, step 6, step 34, step 35, step 37, step 38, step 40, step 41, step 43, step 44, step 49, step 50, step 52, step 53, step 54 and step 55 before repeating itself and returning to step START. This prevents a LOW state pulse from the circuits connected to ports IST, ITE, INS, IRS and IAX from being interpreted more than once in a single passage of such a loop. The TIME DELAY as shown in steps 18, 32, 57, 71, 105, 107, 116(A), 117, 122, 133, 151, 153, 171, 189 and 191 are of this described time duration. The TIME DELAY as shown in steps 117, 133, 151, 171 and 189 may be of a longer duration to provide a better separation between the speed of new settings as the new settings are effected.

Figure 13A:
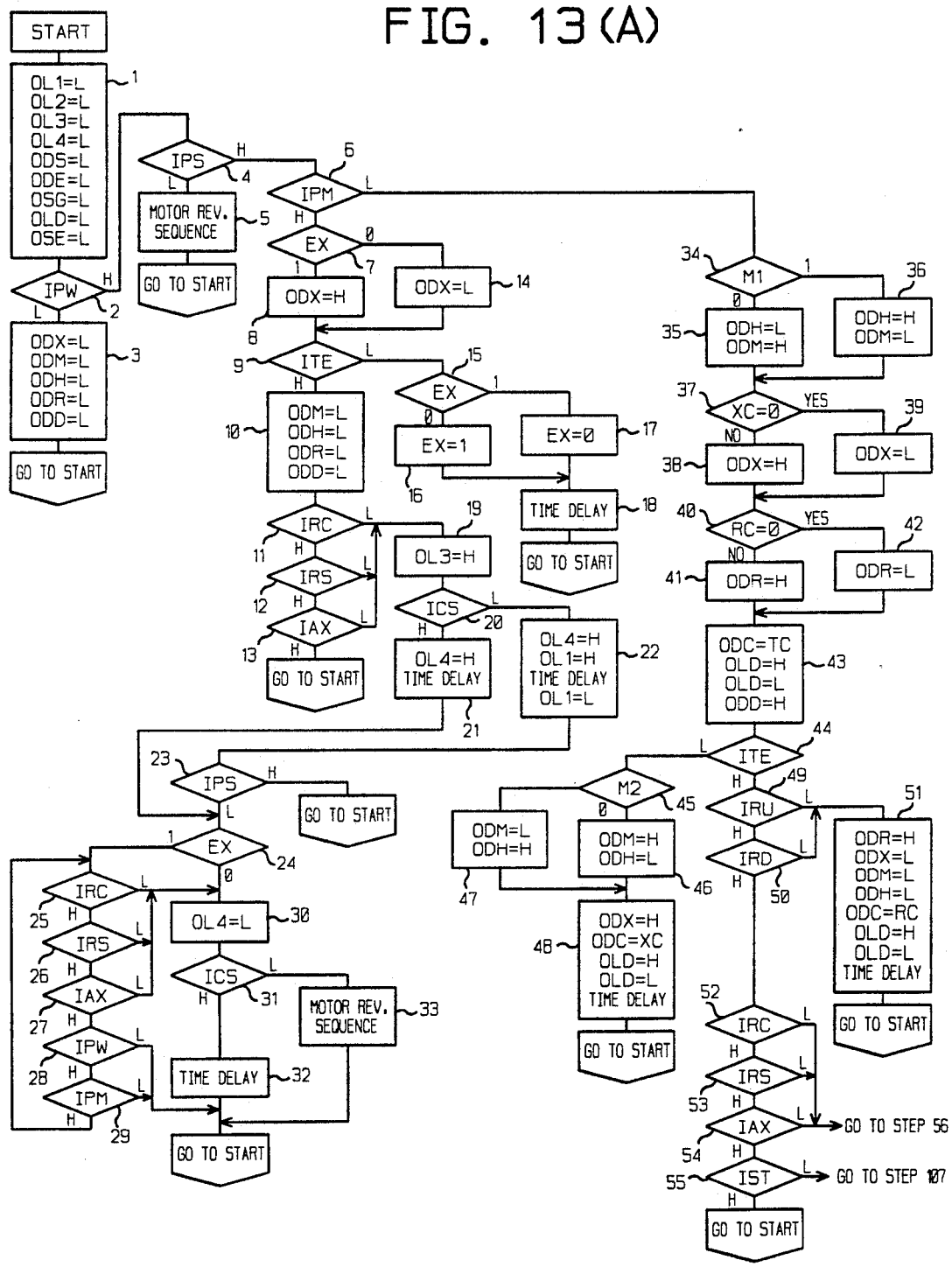
FIG. 13(A), FIG. 13(B), FIG. 13(C), FIG. 13(D), FIG. 13(E) and FIG. 13(F) are a flowchart illustrating a general sequence for a microcomputer which controls operation of the invention.
Figure 13B:
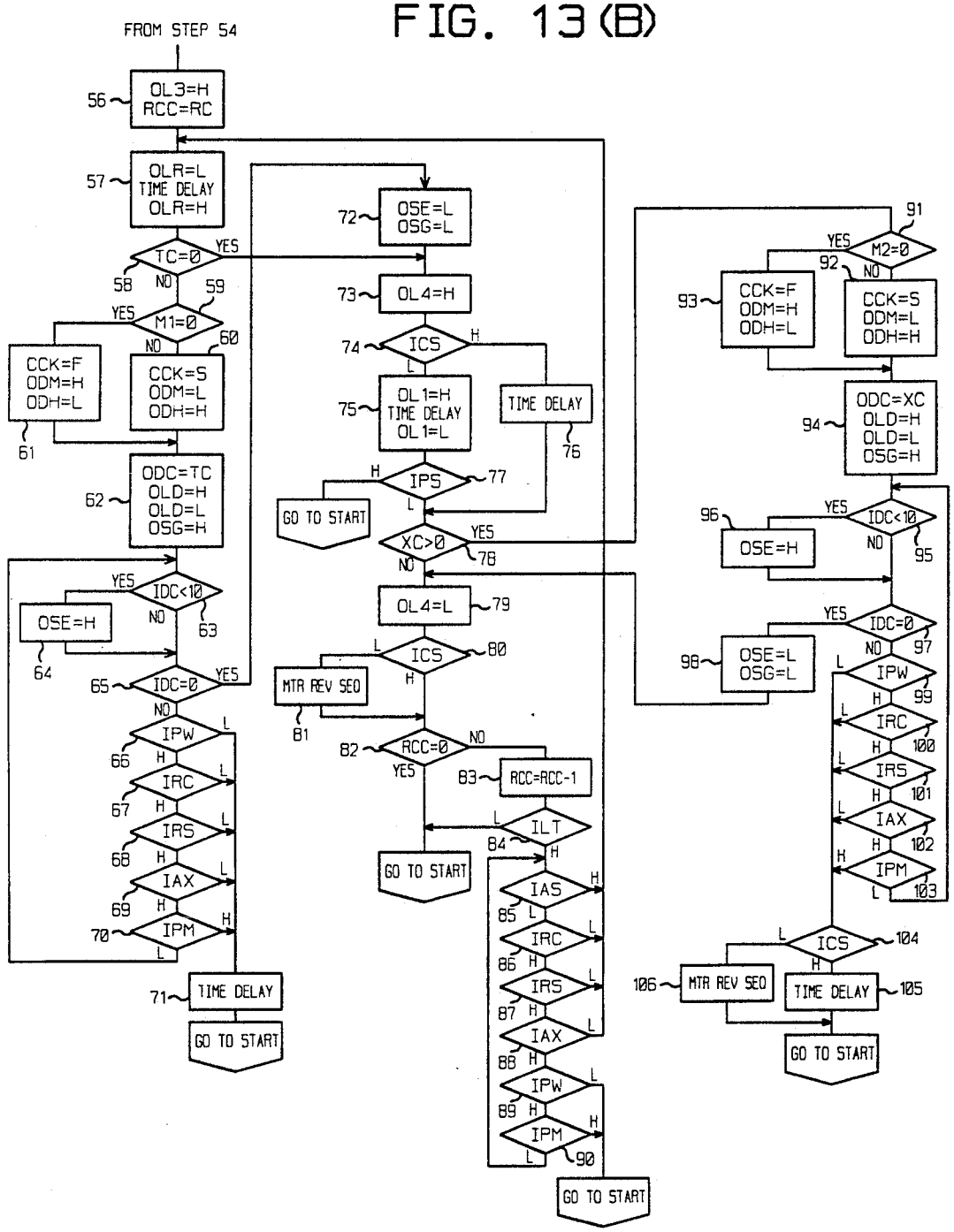
Figure 13C:
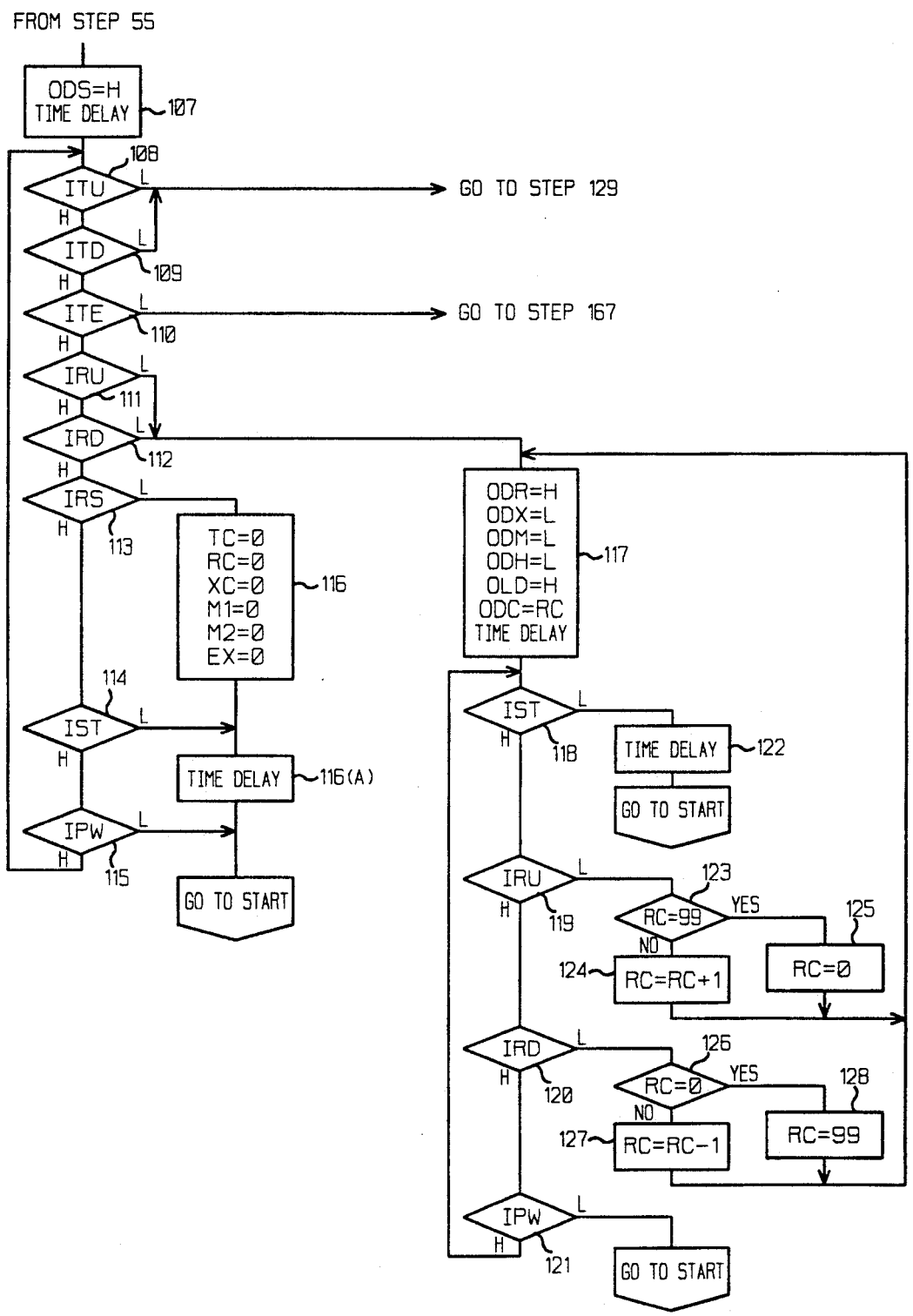
Figure 13D:
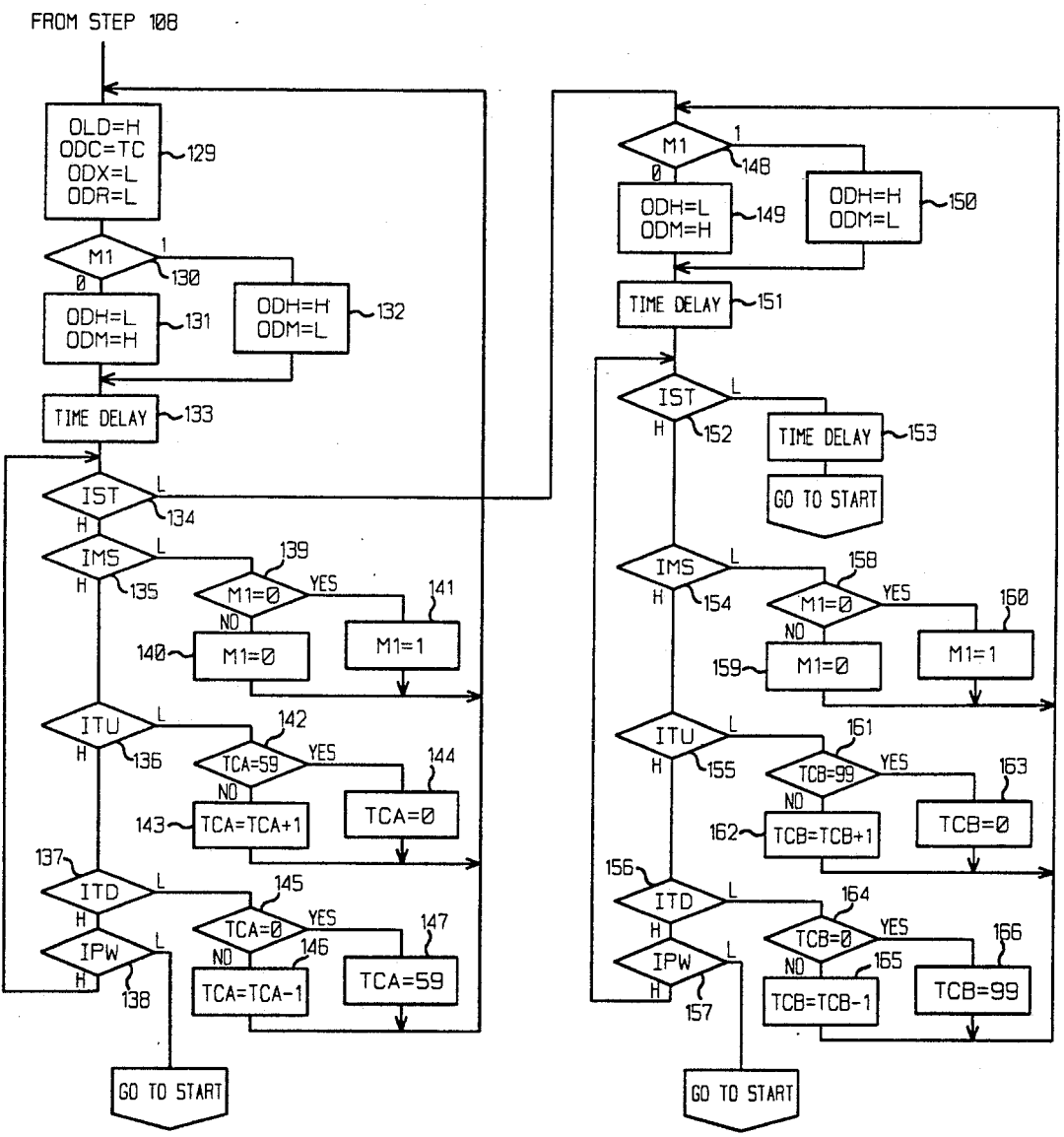
Figure 13E:
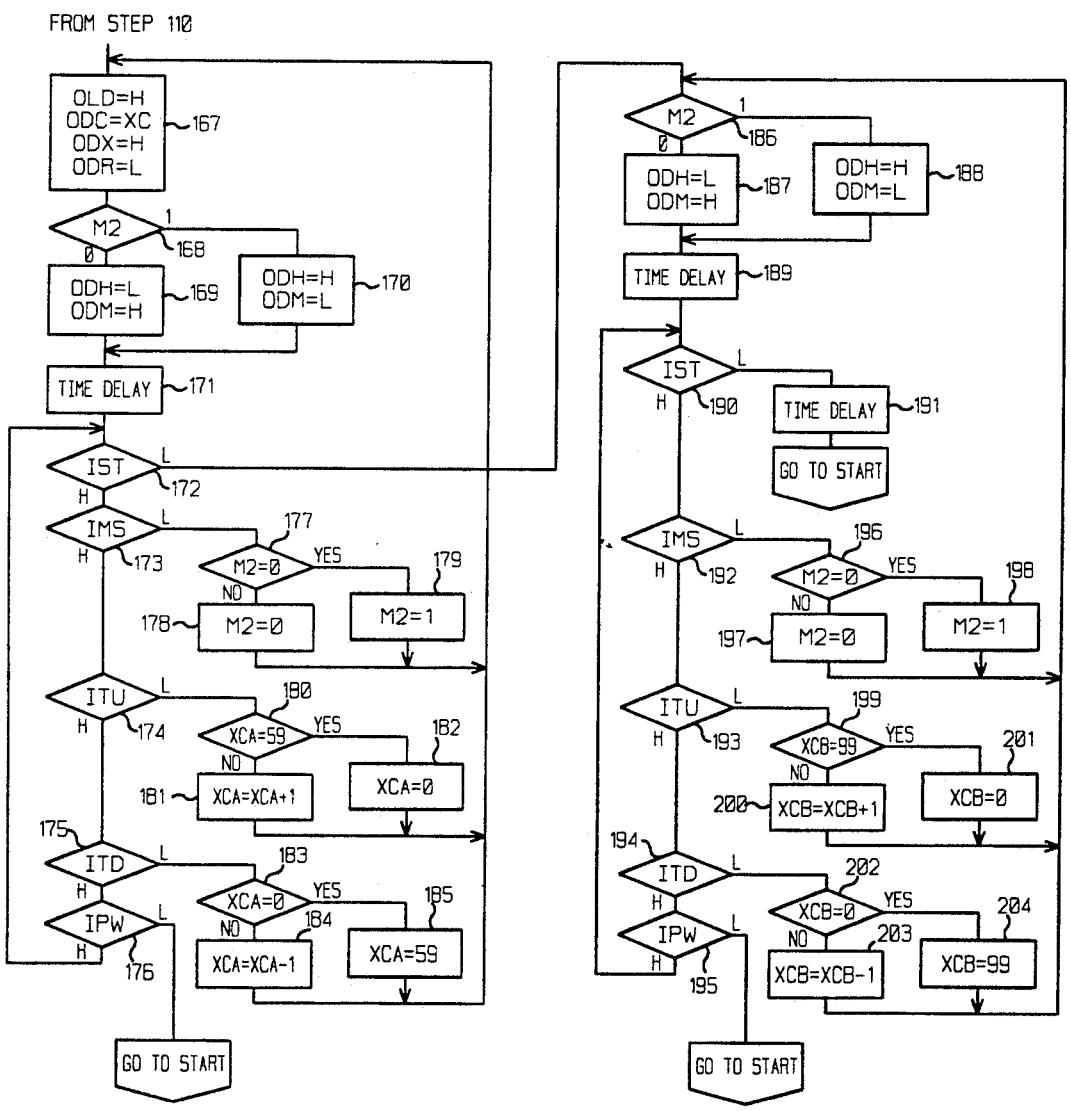

Registers used in MICOM which are set and read by steps in the programs shown in FIG. 13(A), FIG. 13(B), FIG. 13(C), FIG. 13(D), FIG. 13(E) and FIG. 13(F) comprise the following:

register RC contains the number of repetitions desired of an activation sequence shown in FIG. 13(B) and is set as shown in FIG. 13(C);

register RCC is a temporary register used in a count-down sequence shown in FIG. 13(B);

register TC contains the amount of time to elapse before an activation sequence shown in FIG. 13(B). It comprises a first quantity TCA which is the units and tens quantity to a maximum count of 60 and a second quantity TCB which is the hundreds and thousands quantity to a maximum count of 99. When a reference is made to TC it refers to the aggregate quantity of units, tens, hundreds and thousands of both TCA and TCB;

register XC contains the amount of time to elapse before an activation sequence shown in FIG. 13(B). This is the time exposure sequence. It comprises a first quantity XCA which is the units and tens quantity to a maximum count of 60 and a second quantity XCB which is the hundreds and thousands quantity to a maximum count of 99. When a reference is made to XC it refers to the aggregate quantity of units, tens, hundreds and thousands of both XCA and XCB;

register EX contains data set in FIG. 13(A) to identify a time exposure section in the manual mode of FIG. 13(A). It is also set in the reset section of FIG. 13(C);

register MI contains data set in FIG. 13(D) and used in FIG. 13(A) to set display ports and in FIG. 13(B) to designate a clock speed;

register M2 contains data set in FIG. 13(E) and used in FIG. 13(A) to set display ports and in FIG. 13(B) to designate a clock speed.

Converters IC1, IC2, IC3, IC4 and IC5 are equipped with a schmitt trigger and may be components of a single element chip and electrically configured with proper power and ground as is well known in the art.

The inputs and battery supplies shown in FIG. 12 may be electrically conditioned with necessary filter capacitors as is well known in the art.

Relay RY1 is a DPDT relay with a relay coil which when activated moves its switch elements in unison from position B which is the non-activated state to position A, as is well known in the art.

Receiver RCVR, used in this embodiment, is a module style infra-red detector, decoder and driver configured to produce at its output a LOW state of a predetermined brief duration upon receiving a suitably coded infra-red input, as is well known in the art. It has a default HIGH state at its output when not delivering the above mentioned LOW state.

Receiver RCVR may also be, in other embodiments, any receiver capable of receiving wireless data and interpreting such data to provide a suitable electrical response.

Transmitter 160 is an electrical circuit, housed in an enclosure suitable to be light-weight, portable and hand held, capable of producing suitably coded bursts of infra-red radiation directed through lens plate 161 upon activation by the depressing of push button switch 162 located on its top face. This type of transmitter, as is used in this embodiment, is well known in the art.

Transmitter 160 may also be any device capable of producing suitable powerful and coded wireless data able to be received and interpreted by a receiver housed in enclosure 117.

Figure 16:
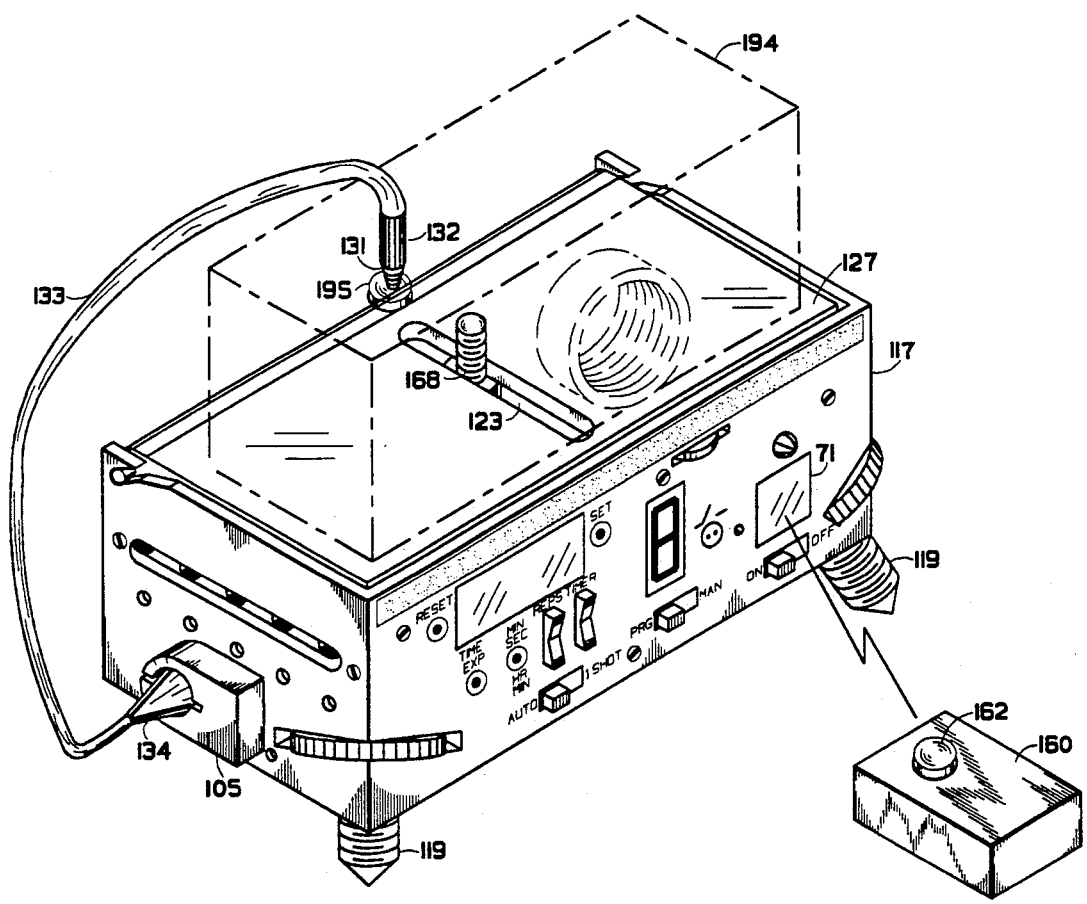
FIG. 16 is a perspective view of the invention with one type of camera secured to its top face and without the bracket.

In operation, a camera of the type which allows mounting by a standard tripod bolt 168 as shown by camera 190 and 194 in FIG. 14 and FIG. 16 respectively is placed against lid platform 127 of lid 120 and bolt 168 is threaded into the respective camera through elongated channel 123 to secure it to the lid platform 127. The camera may be mounted to face in any direction and may be slidably adjusted along channel 123 to achieve a desired position of utility or balance. The lid 120 may be either in a removed state from enclosure 117 or rotated about its hinge pins 124 and 126 to effect the attachment or adjustment of a camera to its lid platform 127. Referring also to FIG. 1 and FIG. 6, the lid 120 is then secured to enclosure 117 by guiding hinge pins 124 and 126 along hinge channels 92 and 93 allowing hinge cylinder 125 to seat in concavity 81. Lid 120 is then rotated towards top face of enclosure 117 allowing lid tongue 121 to pass into opening 87. Latch disk 113 is the rotated to allow it's inclined protruding spiral cam to key into tongue keyway 122 and thereby secure the lid 120 to the top face of enclosure 117 achieving the effect as shown in FIG. 14, FIG. 15 and FIG. 16.

With cable 133 docked in shoe housing 105, a camera not secured to enclosure 117 but instead secured to a tripod or placed on another surface may be connected to cable 133 with coupling threads 131 on cameras equipped to receive a cable release. Enclosure 117 may be placed on a surface in close proximity to a camera in this setting or secured to a leg of the tripod with latching straps 166 looping around such a leg and attaching to latch strips 116 and 118.

FIG. 15 shows camera 192, which can not be secured to lid 120 with a standard tripod mount 168, secured to enclosure 117 with latching straps 166 attached to latching strip 116 and latching strip 118 shown in FIG. 2. Latching straps 166 flow over camera 192 in appropriate positions to effect securement to enclosure 117 and still allow the lens opening, veiwfinder and other necessary features of camera 192 to be functional. Bracket components as herein described are assembled to allow plunger housing 150 to be aligned over shutter release button 193 in a close enough proximity so as to allow plunger piston 153, shown in FIG. 8, to contact shutter release button 193 and effect the release of the shutter. Cable 133 is shown docked in shoe housing 105 and also docked to plunger housing 150 as herein described. The enclosure 117 may be supported by adjustable legs 119 or by securing enclosure 117 to tripod 196 as herein described.

Referring to FIG. 14 and FIG. 15 and FIG. 16 a coded pulse of electromagnetic waves are emitted from transmitter 160, positioned within a predetermined range of receiver 71, by the depression of push button switch 162. upon receiving the coded pulse from transmitter 160 receiver 71 decodes the pulse and passes along output electrical data to points in the electrical circuit as shown in FIG. 12. Pulses received by receiver 71 not interpreted by receiver as being of a predetermined code and sequence prevent the proper output electrical data from being passed to electrical circuits as shown in FIG. 12.

In the descriptions that follow referring to FIG. 12, FIG. 13(A), FIG. 13(B), FIG. 13(C), FIG. 13(D), FIG. 13(E) and FIG. 13(F) a further reference to FIG. 1 and FIG. 4 can be made for further clarification.

Referring to the FIG. 12 legend in this description and FIG. 12, when RCVR receives the wireless control data in the form of a proper pulse as described a Low pulse is fed through diode D2 and also to input port IRC of microcomputer MICOM. From diode D2 a LOW pulse puts the output of latch circuit comprising IC1, R2, IC2 and R1 in a LOW state thereby making input port ILT LOW. The closing of push button switch SWRST feeds a LOW pulse through diode D1 also to the above described latch circuit with like results.

Referring to FIG. 12 and FIG. 13(A), FIG. 13(A) shows the beginning of the flowchart for the operation of microcomputer MICOM in FIG. 12. When microcomputer MICOM receives power from VBAT1 at ports V+ and GND reset capacitor C1 causes the microcomputer to refer to the START step in FIG. 13(A). Step START flows to step 1 which puts output ports OL1, OL2, OL3, OL4, ODS, ODE, OSG, OLD AND OSE to a LOW state.

A LOW state at output port OL1 keeps inverter IC3 output in a HIGH state keeping transistor TR1I turned off leaving relay RY1 in a passive state with its switch contacts remaining in position B as shown in FIG. 12.

A LOW state at output port OL2 keeps metal oxide field effect transistor (MOSFET) TR2 turned off.

A LOW state at output port OL3 passes through diode D9 to inverter IC4 putting its output HIGH and leaving light emitting diode LED turned off.

A LOW state at output port OL4 puts inverter IC5 output in a HIGH state and turns transistors TR3 and TR4 off. This puts the terminals at jack J2 in a state of very high resistance to each other achieving a condition similar to an open circuit.

A LOW state at output port ODS turns the SET signifier on display LCD off.

A LOW state at output port ODE turns the ERROR signifier on display LCD off.

A LOW state at output port OSG stops the counter CNTR from proceeding with any counting.

A LOW state at output port OLD prevents the counter CNTR from loading into its buffers any data presented at its data input ports.

A LOW state at output port OSE prevents display 7SEG from displaying its contents.

The program flows to step 2 which checks the state of input port IPW. With power switch 68, which is SWPW1 and SWPW2 ganged together on the same DPDT slide switch, in the open position VBAT2 is disconnected from the relay RY1 and VBAT1 is disconnected from D4 putting port IPW at its default state of LOW and does not provide operating voltage and current VDD to the required parts of the circuit. Although the microcomputer remains powered at ports V+ and GND the device is considered to be off and in a passive state when power switch 68, being SWPW2 and SWPW1, is in an open position. With switch 68 closed SWPW2 connects VBAT2 to switch contacts on relay RY1 and SWPW1 provides voltage VDD and passes a HIGH state to port IPW through diode D4.

With a LOW state at port IPW the program flows to step 3 which sets output ports ODX, ODM, ODH, ODR and ODD to a LOW state.

A LOW state at output port ODX turns the TIME-EXP signifier on display LCD off.

A LOW state at output port ODM turns the MIN-SEC signifier on display LCD off.

A LOW state at output port ODH turns the HR-MIN signifier on display LCD off.

A LOW state at output port ODR turns the REPS signifier on display LCD off.

A LOW state at output port ODD turns the digits on display LCD off.

The program flows back to the START position and will continue the loop on steps 1, 2, 3 and START until interrupted at step 2 with port IPW at a HIGH state signifying that the device is now turned on.

The program flows from step 2 with a HIGH state at port IPW to step 4 which checks the state of port IPS. With SWPS1 in an open position port IPS is at a default state of HIGH and the program flows to step 6. This condition is achieved when, referring to FIG. 4, piston 49 is in a position sufficiently along threaded shaft 48 to intersect switch lever 56 and thereby cause switch 55, being SWPS1, to achieve an open circuit condition. If port IPS is at a LOW state the program flows to step 5. This condition exists when, in FIG. 4, piston 49 is not in a position to intersect switch lever 56 putting switch 55, being SWPS1, in a closed position and thereby putting port IPS in a LOW state.

Figure 13F:
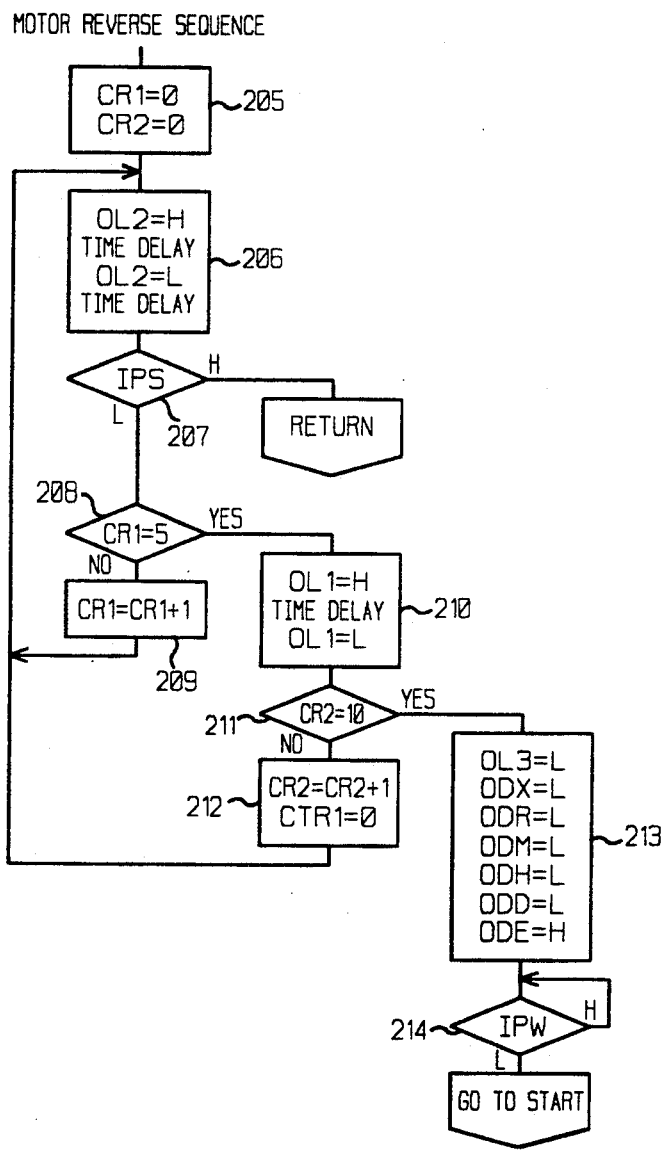

Step 5 is a MOTOR REVERSE SEQUENCE shown in FIG. 13(F). its purpose is to move piston 49 to a position along threaded shaft 48 to turn switch 55, being SWPS1, via lever 56 to an open circuit state. If this sequence cannot achieve this result, after an included predetermined number of attempts, an error message is displayed and the program goes into an endless loop awaiting intervention by the operator to turn off the power switch 68 and check the validity of the battery supply or other conditions which may be impeding the operation of the device. This sequence incorporated into the program functions as an error detection and correction protocol.

Step 205, being the first step of the MOTOR REVERSE SEQUENCE, sets counters CR1 and CR2 to zero and flows to step 206. Step 206 sets port OL2 to a HIGH state for a predetermined period set by TIME DELAY and then sets port OL2 to a LOW state and another TIME DELAY follows before the program flows to step 207. With OL2 in a HIGH state transistor TR2, in FIG. 12, is turned on completing a circuit between VBAT2, SWPW2 which is considered to be closed for the purposes of this description, relay RY1 switch contacts at position B, switch SWPS2 in position C and motor M, being 39. Switch SWPS2 is ganged together with SWPS1 in a DPDT switch being 55. When SWPS1 is in an open position SWPS2 is at position D. When SWPS1 is in a closed position SWPS2 is at position C. Accordingly, SWPS2 is at position C until this sequence moves piston 49 to a position intersecting switch lever 56 and subsequently changing the position of SWPS2 to position D. Motor M, being 39, rotates in a direction, determined by the polarity of voltage at its terminals, to cause piston 49 to move along threaded shaft 48 in the direction longitudinally towards the motor 39 and therefore towards switch lever 56. The two time delays TIME DELAY shown in step 206 create a pulsing of motor 39 to effect a speed control. The speed control prevents piston 49 from excessively moving past the point at which piston 49 intersects switch lever 56 and subsequently turning motor 39 off. The speed control therefor prevents such an excessive build-up of inertia in motor 39. Step 207 checks the state of port IPS. If piston 49 has moved sufficiently to intersect switch lever 56 and subsequently set SWPS1 to an open position then IPS will be at its default state of HIGH and the program flows to the point in the program where this sequence was called. At this point SWPS2 is at position D directing induced voltages produced in motor M back into motor M through diode D6. This is well known in the art as dynamic braking. Diodes D7 and D8 protect MOSFET transistor TR2 against induced voltages produced by the motor M which could damage it, as is well known in the art. If piston 49 has not moved sufficiently then port IPS will be at a LOW state and the program flows to step 208 which checks the contents of counter CR1. If the contents of the counter CR1 is not a predetermined quantity, this embodiment uses 5 as that predetermined quantity, then the program flows to step 209. Step 209 advances the count in counter CR1 by a quantity of one and the program flows back to step 206 where motor 39 is again turned on and off for a predetermined time before the program flows to step 207 to check whether the piston has moved sufficiently and if not then flowing to step 208, step 209 and back to step 206. This loop continues until either port IPS is at a HIGH state or counter CR1 reaches a predetermined quantity, in this embodiment 5. When step 208 determines that counter CR1 is at its predetermined quantity the program flows to step 210.

Step 210 sets port OL1 to a high state for a predetermined TIME DELAY and then sets port OL1 to a LOW state. With OL1 in a HIGH state converter IC3 output is at a LOW state and transistor TR1 is turned on through resistor R3. Current then flows through relay RY1 coil causing relay RY1 switch contacts to move to position A. This connects motor M to battery VBAT2 with a polarity reversed from that when relay RY1 switch contacts are at position B. Motor M, being 39, rotates and causes gear 44 to rotate in a direction allowing its cam 45 to rotatably move away from cam 47 on disk 46 in a first direction but thereby also moving cam 45 towards cam 47 in a second direction. Diode D5 directs induced voltages, produced in relay RY1 coil by its being turned on and off, back into relay RY1 coil to protect the rest of the circuit from these induced voltages. The TIME DELAY in step 210 is of a short enough duration so as to only allow the movement of cam 45 to be less than that movement required to move cam 45 between a first contact with cam 47 in a first direction and a second contact of cam 45 with cam 47 in a second direction. The program then flows to step 211 which checks the contents of counter CR2. If CR2 is not at a predetermined quantity, this embodiment uses 10, then the program flows to step 212 which advances the count of CR2 by a quantity of 1 and resets counter CR1 to zero. The program flows to step 206 which is part of a herein described loop which flows until step 211 determines that a predetermined quantity has been reached, this embodiment uses 10, and flows to step 213. Step 213 sets ports OL3, ODX, ODR, ODM, ODH and ODD to a LOW state which have been herein described. Step 213 also sets port ODE to a HIGH state which turns on the ERROR signifier on display LCD. The program then flows to step 214 which is an endless loop on itself until port IPW is at a LOW state which means that the device's power switch 68 has been turned off as described herein. The program then flows back to START.

Step 210 as described has the effect of backing cam 45 away from cam 47 and then in step 206 advancing cam 45 towards cam 47 after a partial rotation free of contact. This tends to act as a mild hammering effect on cam 47 by cam 45 in an attempt to rotate threaded shaft 48 against an impedance caused by some event such as excessive tightening of threads on shaft 48 in piston nut 50. This hammering continues for a preset number of attempts as determined by step 211 and then causes the program to default to an error mode in steps 213 and 214.

Step 208 determines the number of motor pulses generated in step 206 that should be more than adequate required to move piston 49 from a fully advanced position to a position intersecting switch lever 56. This position is a position considered in this invention as a default normal resting position awaiting commands which is why the program ensures the attainment of this position immediately after the power switch 68 is turned on via steps 4 and steps 5.

From step 4 when port IPS is at a high state the program flows to step 6 which checks the state of port IPM. This has the effect of determining whether the invention is to be operated by the programmed timing sequences or manually without the programmed timing sequences according to the position of switch 67, being SWPRM. If switch 67, being SWPRM, is in a closed circuit position then IPM is at a LOW state and the program flows to step 34 which is the start of the programmed mode. If switch 67, being SWPRM, is in an open circuit position then port IPM is at its default HIGH state and the program flows to step 7, being the manual mode.

Step 7 checks the contents of register EX. If EX is zero then the program flows to stop 14 which sets port ODX to a LOW state thereby turning off the TIME-EXP signifier on display LCD and the program flows to step 9. If EX is one then the program flows to step 8 which sets port ODX to a HIGH state thereby turning on the TIME-EXP signifier on display LCD and the program flows to step 9.

Step 9, step 15, step 16 and step 17 have the effect of toggling the contents of register EX between one and zero by the closing of push button switch 62, being SWTEX, and absorbing the pulse length produced by the closing of push button switch 62 in step 18 TIME DELAY. The program flows back to START to reflow in sequence to step 10, provided no other conditions in the encountered steps occurs which prevent it, where it continues.

Step 10 sets ports ODM, ODH, ODR and ODD to a low state turning off their respective signifiers on display LCD as already described herein and flows to step 11.

Step 11, step 12 and step 13 check the state of ports IRC, IRS and IAX respectively and if any of these named ports are at a LOW state the program flows to step 19. If all of these named ports are at a HIGH state the program flows back to START to continue. Ports IRC, IRS and IAX all remain at their default HIGH state until taken to a LOW state by RCVR, as previously described, closing switch SWRST or the closing of a switch connected to jack J1 respectively. Inserting a plug into jack J1 opens its included switch and thereby cuts off the ground connection for receiver RCVR, rendering receiver RCVR inoperative. A connection to jack J1 may be any configuration which provides the equivalent of a closed switch and may be connected to an event detecting the absence or presence of movement, heat, light, sound or other stimulus.

Step 19 sets port OL3 to a HIGH state. This allows inverter IC4 along with resistors R4 and R6 and capacitor C2 and diode D10 to operate as an oscillator with an on duty cycle being shorter than its off duty cycle, as is well known in the art. This oscillator circuit flashes light emitting diode LED on and off through resistor R5. The shorter on time for the LED serves to reduce the drain on battery VBAT1 while the LED is in its flashing state as described.

The program then flows to step 20 which checks the state of port ICS. When cable release cable neck 134 is properly docked in shoe housing 105 through portal 103 as previously described, leaf switch 110, being SWCBL, is in a closed circuit position. This condition puts port ICS in a LOW state and the program flows to step 22. If the described cable docking is not in effect then switch SWCBL is in an open circuit position and port ICS is at it's default HIGH state and the program flows to step 21.

Step 22 sets output port OL4 to a HIGH state which puts inverter IC5 output at a LOW state and turning on transistors TR3 and TR4 through resistors R8 and R9 respectively and thereby allowing transistors TR3 and TR4 to function as a bilateral low resistance path for the terminals of jack J2 similar to a closed switch. Diodes D11 and D12 allow the bilateral condition. Resistor R7 keeps the transistors TR3 and TR4 turned off when inverter IC5 output is at a HIGH state or when power switch 68 is turned off and voltages are present at the terminals on jack J2 from an external source. The terminals of jack J2 may be connected by electric cable to a camera's external activation ports on a camera equipped with an electrically controlled shutter release feature or to another peripheral or device which can be activated by a closing of a such a switch as described above.

Step 22 then sets port OL1 to a HIGH state for a predetermined TIME DELAY and then sets port OL1 to a LOW state. This causes motor M to be rotated as previously described. This rotation is for a long enough duration, set by TIME DELAY in step 22, to allow piston 49 to move in a direction towards enclosure wall 28 and reach enclosure wall 28. In so moving, piston 49 contacts cable core piston 137 already inserted and advances cable core piston 137 in the same direction as the movement of piston 49. This has the effect of advancing the cable core 130 and releasing the shutter of a camera thereto attached at the other end or extending the plunger piston 153 which in turn releases the shutter of a camera with a mechanically controlled shutter release properly aligned therewith.

The program flows to step 23 which checks the state of port IPS. If for any reason the piston 49 has failed to move enough from the actions of step 22 to move away from switch lever 56 so that SWPS1 is in the open position, then port IPS will be at its default HIGH state and the program flows to START. A reason for such an inadequate movement by piston 49 could be a weak battery VBAT2. The program then flows to step 24.

Step 21 sets the port OL4 to a HIGH state which achieves the results previously described. This step has the effect of bypassing the mechanical movement of piston 49 in step 22 but still provides the closed circuit condition at jack J2. After a predetermined TIME DELAY, long enough for circuits connected to jack J2 to respond to the condition, the program flows to step 24.

Step 24 checks the contents of register EX. A contents of one flows the program to step 25 which is the time exposure mode and has been so signified on display LCD in step 8. Cameras with a "B" setting and so configured and properly configured with this invention would at this point have their shutters open due to step 21 and step 22. In order to close the shutter the program is waiting for a condition in steps 25, 26 and 27 to allow the program to flow to step 30 which turns off the flashing LED and advances to step 31 which checks for a cable docking as described in step 20. Stop 33 returns piston 49 to a point intersecting switch lever 56 which allows the shutter to close and the program flows back to START. If step 31 determines that no cable docking is in effect the program bypasses the mechanical sequence of step 33 and proceeds through TIME DELAY in step 32 to START. The TIME DELAY in step 32 is of a long enough duration to absorb the pulse duration generated by receiver RCVR or by the closing of SWRST or the closing of a switch connected to J1 as has been previously described. The opening of power switch 68 during the loop comprising steps 25, 26, 27, 28 and 29 causes at step 28 the program to flow to START and step 1 which will cause an open circuit condition at J2 thereby closing the shutter on cameras connected to J2 but piston 49 will remain in the advanced position until power switch 68 is again turned on. This condition allows piston 49 to remain advanced indefinitely if so desired and subsequently keeping open the shutter of a camera properly connected thereto of the type with a "B" setting.

If in step 24 register EX is zero the program advances to step 30, 31 and either step 32 or step 33 to START giving results as described above.

Steps 6 through 33 and then to START are the manual mode of operation for this invention which allow a properly attached camera to have its shutter released on command from a remote transmitter and allowed to subsequently reset. This mode also allows a time exposure function controlled by a remote transmitter. This briefly summarizes the manual mode of operation as herein described without detailing all of the inherent functions.

Step 34 is the beginning of the programmed sequence. Stops 34, 35 and 36 turn on either the MIN-SEC or the HR-MIN signifier of display LCD according to the contents of register M1.

Steps 37, 38 and 39 turn on the TIME-EXP signifier of display LCD if the contents of register XC is not zero.

Steps 40, 41 and 42 turn on the REPS signifier of display LCD if the contents of register RC is not zero.

Step 43 sets port ODC with the contents of timer contents register TC and loads this data into the counter CNTR buffers by taking load port OLD to a HIGH state and then back to a LOW state. The data from the counter CNTR buffers flows through to display LCD. Digit elements of display LCD are turned on with port ODD set to a HIGH state.

Step 44 checks for the closing of SWTEX. This step starts the display of the time exposure settings if a closing of switch SWTEX and the subsequent Low state at port ITE occurs. Steps 45, 46 and 47 turn on the appropriate clock mode signifier, either MIN-SEC or HR-MIN, of display LCD according to the contents of register M2.

Step 48 turns on the TIME-EXP signifier of display LCD and sets port ODC with the contents of register XC and loads this contents into the counter CNTR buffers by taking load port OLD to a HIGH state and then back to a LOW state. The data from the counter CNTR buffers flows to display LCD as herein described. The TIME DELAY in step 48 retains this display condition for a predetermined time, practically a few seconds, to allow the display to be read by its operator. The program then flows to step START to continue its loop.

Step 49 and step 50 checks for the REPS switch 64, comprising switch SWRPU and SWRPD on the same rocker style switch as herein described, to be pushed in either direction. If so pushed, either port IRU or IRD will receive a LOW state and the program flows to step 51 which changes the display LCD as shown and loads the repetitions register RC contents as shown. The TIME DELAY in step 51 is similar to that of step 48 as described.

At steps 52, 53 and 54 a LOW state from one of the named ports which will send the program flow to step 56, being the beginning of the programmed activation sequence. A properly interpreted reception of receiver RCVR, a closing of reset switch 60 being SWRST or the closing of a switch connected to jack J1 will produce such a LOW state.

If no such LOW state is detected in steps 52, 53 and 54 the program flows to step 55 which will send the program to step 107, being the beginning of the set sequence, if a LOW state is present at port IST. A closing of switch 61, being SWSET, will produce such a LOW state. If no such LOW state is detected at step 55 the program flows back to step START to begin another loop. These loops are executed at an extremely rapid pace as is well known in the art.

The steps shown in FIG. 13(B) comprise the programmed activation sequence which is the sequence controlling the activation of motor 39 and its subsequent results on the movement of piston 49 according to a programmed set of instructions. These instructions allow a time delay, an elapsed time, a sequence of repetitions and a one shot or automatic flow of the instructions. A reference to descriptions already detailed herein allows one skilled in the art to follow the flow and the subsequent results of this sequence comprising the following steps: steps 56, 57, 58, 59, 60, 61, 62, 63, 64, 65, 66, 67, 68, 69, 70, 71, 72, 73, 74, 75, 76; 77, 78, 79, 80, 81, 82, 83, 84, 85, 86, 87, 88, 89, 90, 91, 92, 93, 94, 95, 96, 97, 98, 99, 100, 101, 102, 103, 104, and 105.

The steps shown in FIG. 13(C) comprise the start of the set sequence which set the parameters for the operation of the activation sequence shown in FIG. 13(B) and the main program shown in FIG. 13(A). The set sequence continues in FIG. 13(D) and FIG. 13(E). FIG. 13(D) comprises the timer set sequence and FIG. 13(E) comprises the time exposure duration set sequence. FIG. 13(C) comprises a sequence for resetting certain parameters in unison and also comprises a sequence for setting the number of repetitions. A reference to descriptions already detailed herein allows one skilled in the art to follow the flow and the subsequent results of the sequences shown in FIG. 13(C), FIG. 13(D) and FIG. 13(E) comprising the following steps: steps 107, 108, 109, 110, 111, 112, 113, 114, 115, 116, 116(A), 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203 and 204.

FIG. 13(P), being the MOTOR REVERSE SEQUENCE as previously described, is applicable as shown in steps 5, 33, 81 and 106.

The RESET switch being switch SWRST, 60, is used as an on-enclosure activation switch when not in its role as a reset switch as herein described.

All functions relating to time delay, time lapse, time exposure and repetitiveness are presettable by a human operator but once set, a camera properly configured with the invention can be operated automatically by the invention without a need for human intervention through its use of control data from the microcomputer.

With switch 67, being SWPRM, in the manual mode which is in the open position and the power switch 68 turned on, a pushing of transmitter switch 162 or a pushing of RESET switch 60 causes flashing LED 72 to be turned on and causes a piston activation sequence. This piston activation sequence is in 2 stages, stage 1 and stage 2. Stage 1 comprises motor 39 rotating gear 43 which rotates gear 44 which engages and rotates disk 46 which rotates shaft 48 through piston nut 50 propelling piston 49 forward, away from the motor 39, contacting and advancing cable core piston 137 causing the release of the camera's shutter. Stage 2 comprises motor 39 rotating in an opposite direction from stage 1 causing gear 44 to rotate freely on shaft 48 until its cam 45 strikes cam 47 on disk 46 and thereby starts the rotation of shaft 48 in an opposite direction from stage 1 through piston nut 50. This rotation propels piston 49 backwards toward the motor 39. When piston 49 intersects switch lever 56 to effect a change of states of switch 55 the motor 39 is turned off and the piston 49 subsequent stops. This allows cable core piston 137 to return to its position at the start of stage 1 through its included spring. The camera's shutter is ready for another cycle if its film has advanced. Stage 2 also turns off flashing LED 72. If at the beginning of stage 1 the LCD display has the TIME-EXP signifier visible, which is toggled on and off by the depressing of TIME EXP switch 62 in the manual mode, stage 2 will be delayed until either transmitter switch 162 is again depressed or RESET switch 60 is depressed. A camera equipped with a "B" setting and so set will thus achieve a time exposure. Step 6 through step 33 in FIG. 13(A) further detail this mode of operation.

In the PROGRAM mode switch 67 is in the closed position and a depressing of SET switch 61 starts the set mode and allows the setting of parameters as shown in FIG. 13(C), FIG. 13(D) and FIG. 13(E). Activation of stages 1 and 2 of the piston activation sequence described above are effected in the time, order and repetition according to the programming steps shown in FIG. 13(B).

A study of these descriptions and drawings herein will allow one skilled in the art to understand the operation of and appreciate all the features and benefits of this invention.

While particular embodiments of the invention have been described and illustrated herein, it will be apparent to those skilled in the art that various modifications can be made without departing from the spirit and scope of the invention.

I claim:

1. A freestanding adjustable mount and shutter release means for a plurality of styles of a camera comprising:
   a generally rectangular shaped enclosure, housing an electrically controlled piston and means for receiving and interpreting wireless control data for said piston, with a capability of adjustably mounting a camera and means for linking the camera's shutter release system to said piston;
   a plurality of adjustable support legs slidably secured to said enclosure;
   a presettable means for automatically controlling time delay, time lapse and repetitiveness of said control data;
   means for mounting to said enclosure a camera of a style with included standard tripod mounting means;
   means for mounting to said enclosure a camera of a style without said tripod mounting means;
   means for mounting said enclosure to a tripod;
   a transmitter with means to provide said wireless control data; and
   means for prominently displaying the status of said control data.

2. The adjustable mount according to claim 1 wherein said control data is adapted to be linked to electrically controlled shutter release means on a camera equipped with said electrically controlled shutter release means.

3. The adjustable mount according to claim 2 wherein said piston is adapted to be linked to mechanically controlled shutter release means on a camera equipped with said mechanically controlled shutter release means.

4. The adjustable mount according to claim 3 wherein said control data is directed by an electronic microcomputer.

5. The adjustable mount according to claim 4 wherein said control data is adapted to be selectively connected to an event controlled actuating switch removed from said adjustable mount.

6. The adjustable mount according to claim 5 wherein said adjustable mount is of sufficient light weight and of sufficient small size to be portable in a photographer's accessory carrying case.

7. The adjustable mount according to claim 6 wherein said control data is selectively configured to control said piston with a preset program and able to achieve said control of said piston without intervention by a human operator.

8. A freestanding adjustable mount and shutter release means for a camera comprising:
   a generally rectangular shaped enclosure, housing an electrically controlled piston and means for receiving and interpreting wireless control data for said piston, with a capability of adjustably mounting a camera on said mount;
   an adjustable and fragmentable bracket assembly removably secured to said enclosure capable of being aligned over a camera secured to said enclosure;
   an adjustable plunger assembly, removably secured to said bracket assembly, adapted to be aligned over a camera's shutter release button;
   a cable release removably docked to said enclosure with said cable release aligned with said piston to allow said piston to propel said cable release's core, removably docked to said plunger assembly, to effect an extension of said plunger assembly to contact and thereby activate a shutter release of a camera aligned with said plunger;
   a plurality of latching straps which can selectively be attached to a plurality of latching strips adhered to said enclosure and looped over a camera to secure the camera to said enclosure;
   compartments in said enclosure to removably receive and store components of said bracket assembly when said bracket assembly is fragmented and not in use with said enclosure;
   said compartments in said enclosure to removably receive and store said plunger assembly and said latching straps when not in use with said enclosure;
   a presettable means for automatically controlling time delay, time lapse and repetitiveness of said control data;
   means for mounting to said enclosure a camera of a style with includes standard tripod mounting means;
   a transmitter with means to provide said wireless control data; and
   means for prominently displaying the status of said control data.

9. The adjustable mount according to claim 8 wherein said cable release is docked to said enclosure and aligned with said piston and also adapted to be docked directly to a shutter release button of a camera designed to receive a cable release.

10. The adjustable mount according to claim 8 wherein said mount is adapted to accept a camera of 110 style format.

11. The adjustable mount according to claim 8 wherein said mount is adapted to accept a camera of disposable type.

12. The adjustable mount according to claim 9 wherein said mount is adapted to accept a camera of 35 mm style format.

13. The adjustable mount according to claim 9 wherein said means for displaying said status of said control data comprises a liquid crystal display and a light emitting diode display.

14. The adjustable mount according to claim 9 wherein said control data is selectively configured to control said piston with a preset program and able to achieve said control of said piston without intervention by a human operator.

15. The adjustable mount according to claim 14 wherein said control data and said preset program are directed by an electronic microcomputer.

16. The adjustable mount according to claim 14 wherein an error detection and correction protocol is incorporated into said preset program to effect control of said piston if said piston is caused to be impeded in an unexpected manner.

17. The adjustable mount according to claim 16 wherein said cable release is docked to said enclosure and also adapted to be docked to a camera designed to receive a cable release with the camera not mounted on said mount.

18. The adjustable mount according to claim 17 wherein said enclosure is selectively secured to a plurality of structures by looping said latching straps about said structure and latching said straps to said latching strips on said enclosure.

19. The adjustable mount according to claim 18 wherein said enclosure is adapted to be secured to a leg of a tripod with said latching straps.

20. The adjustable mount according to claim 19 wherein said control data is adapted to be selectively connected to an event controlled actuating switch removed from said adjustable mount.

* * * * *